United States Patent [19]

Bedard et al.

[11] Patent Number: 4,933,068
[45] Date of Patent: Jun. 12, 1990

[54] HYDROCARBON CONVERSION PROCESS USING CRYSTALLINE MICROPOROUS METAL SULFIDE COMPOSITIONS

[75] Inventors: Robert L. Bedard, Fishkill; Lawrence D. Vail, Tappan; Stephen T. Wilson, Shrub Oak; Edith M. Flanigen, White Plains, all of N.Y.

[73] Assignee: UOP, Des Plaines, Ill.

[21] Appl. No.: 416,170

[22] Filed: Oct. 2, 1989

Related U.S. Application Data

[63] Continuation-in-part of Ser. No. 280,757, Dec. 6, 1988, Pat. No. 4,880,761.

[51] Int. Cl.$^5$ ............................................. C10G 47/06
[52] U.S. Cl. ..................... 208/46; 208/108; 208/143; 208/215
[58] Field of Search ............ 208/46, 108, 143, 215

[56] References Cited

U.S. PATENT DOCUMENTS

| | | | |
|---|---|---|---|
| 4,061,724 | 12/1977 | Grose et al. | 423/335 |
| 4,310,440 | 1/1982 | Wilson et al. | 252/435 |
| 4,440,871 | 4/1984 | Lok et al. | 502/214 |
| 4,500,651 | 2/1985 | Lok et al. | 502/208 |
| 4,666,878 | 5/1987 | Jacobson et al. | 208/215 |
| 4,698,145 | 10/1987 | Ho et al. | 208/216 R |
| 4,710,486 | 12/1987 | Lopez et al. | 208/108 |
| 4,728,682 | 3/1988 | Covino et al. | 502/216 |

OTHER PUBLICATIONS

B. Krebs, "Thio-and Seleno-Compounds of Main Group Elements-Novel Inorganic Oligomers and Polymers", Angew. Chem. Int. Ed. Engl. 22 (1983) 113-134.

W. S. Sheldrick and J. Kaub, Z. Naturforsch, 40b, 571-573 (1985).

B. Krebs, and H. J. Wallstab, Z. Naturforsch, 36b, 1400-1406 (1981).

W. S. Sheldrick and J. Kaub, Z. Anorg. Allg. Chem., 536, 114-118 (1986).

M. Evain, M. Queignec and R. Brec and C. Sourisseau, "Chalcogen Substitution in the Ta$_4$P$_4$S$_{29}$ Tunnel Structure: Synthesis and Structure of TaPS$_6$Se." vol. 75, 413-431 (1988).

*Primary Examiner*—Anthony McFarlane
*Attorney, Agent, or Firm*—Thomas K. McBride; Eugene I. Snyder; Frank S. Molinaro

[57] ABSTRACT

This invention relates to a hydrocarbon conversion process using a crystalline composition having a three-dimensional microporous structure of MA$_2$ units where A is sulfur or selenium and having the empirical formula expressed in molar ratios: xR:MA$_{2\pm0.2}$:ZH$_2$O where R represents at least one organic templating agent present in the intracrystalline pore system, x is the moles of R, z is the moles of water and M is germanium or tin. This invention also relates to a composition having the empirical formula expressed in molar ratios: XR:M$_{1-y}$M'$_y$A$_{2\pm0.2}$:ZH$_2$O where M' is a metal such as cobalt, zinc, manganese, iron, nickel, cooper, cadmium and gallium.

16 Claims, No Drawings

HYDROCARBON CONVERSION PROCESS USING CRYSTALLINE MICROPOROUS METAL SULFIDE COMPOSITIONS

CROSS REFERENCE TO RELATED APPLICATION

This application is a continuation-in-part of prior copending application 07/280,757 filed December 6, 1988, now U.S. Pat. No. 4,880,761.

BACKGROUND OF THE INVENTION

Molecular sieves of the crystalline aluminosilicate zeolite type are well known in the art and now comprise over 150 species of both naturally occurring and synthetic compositions. In general, the crystalline zeolites are formed from corner-sharing $AlO_2$ and $SiO_2$ tetrahedra and are characterized by having pore openings of uniform dimensions, having a significant ion-exchange capacity and being capable of reversibly desorbing an adsorbed phase which is dispersed throughout the internal voids of the crystal without significantly displacing any atoms which make up the permanent crystal structure.

Other crystalline microporous compositions are known which are not zeolitic but which exhibit the ion-exchange and/or adsorption characteristics of the zeolites. These include: (1) a pure silica polymorph, silicalite, having a neutral framework containing neither cations nor cation sites as disclosed in the U.S. Pat. No. 4,061,724; (2) crystalline aluminophosphate compositions disclosed in U.S. Pat. No. 4,310,440; (3) silicon substituted aluminophosphates as disclosed in U.S. Pat. No. 4,440,871 and (4) titanium substituted aluminophosphates as disclosed in U.S. Pat. No. 4,500,651.

All of the crystalline molecular sieves described above are based on the oxide of the metal. It would be very desirable to synthesize crystalline microporous materials based on sulfides and selenides. Since sulfur, unlike oxygen, possesses d electron orbitals of low energy, a great flexibility in configuration is available to sulfur in its bonding with other elements. This flexibility should lead to compositions with unique pore structures which should have novel catalytic and electronic properties. Replacement of oxygen with sulfur or selenium should increase the size of the intracrystalline voids and the micropores and therefore increase the size or amount of the occluded species which can be accommodated in the pore.

The prior art shows that a fair amount of work has been done on metal sulfides and selenides. For example, B. Krebs, "Thio-and Seleno-Compounds of Main Group Elements-Novel Inorganic Oligomers and Polymers", Angew. Chem. Int. Ed. Engl. 22 (1983) 113–134, provides a review of main group thio and seleno compounds such as germanium and tin sulfides. Other reports include: preparation of a $Cs_2As_8S_{13}$ layered compound by W. S. Sheldrick and J. Kaub, Z. Naturforsch. 40b, 571–573 (1985); preparation of thiohydroxo anions of germanium by B. Krebs and H. J. Wallstab, Z. Naturforsch. 36b, 1400–1406 (1981); and preparation of $Cs_2Sb_2Se_4$ by W. S. Sheldrick and J. Kaub, Z. Anorg. Allg. Chem., 536, 114–118 (1986).

However, all the compounds synthesized to date either have a dense structure, a chain, or a layered structure. There is no report of a crystalline three-dimensional microporous metal sulfide or metal selenide. Applicants are the first to synthesize crystalline three-dimensional microporous metal sulfides. Applicants' crystalline metal sulfides have a three-dimensional microporous framework structure of $MS_2$ units where M is germanium, tin, or a combination thereof. The crystalline composition has the following empirical formula expressed in molar ratios: $xR:MA_{2\pm0.2}:zH_2O$, where A is sulfur or selenium, R represents at least one organic templating agent present in the intracrystalline pore system, x has a value of greater than 0 to about 1, and z has a value from 0 to about 4.

Applicants have also been able to synthesize metal sulfide microporous compounds in which some of the germanium or tin atoms have been replaced with one or more metals. Preferred metals may be selected from the group consisting of cobalt, zinc, manganese, iron, nickel, copper, cadmium and gallium. Again, applicants are the first to have synthesized these compounds. Finally, applicants have found that these crystalline three-dimensional microporous composites exhibit adsorption/desorption properties and exhibit fluorescence showing that this new family of compounds have applications in adsorptive separations, as luminescent display materials and as substrates for luminescent sensors or optrodes. These sulfides may also be used as catalysts or catalyst supports in metal sulfide-based catalysts such as hydrogenation, dehydrogenation, dehydration, hydrotreating and syngas conversion reactions.

SUMMARY OF THE INVENTION

This invention relates to a crystalline three-dimensional microporous metal sulfide or metal selenide and a method of preparing the metal sulfide or metal selenide.

Accordingly, one embodiment of the invention is a crystalline composition having a three-dimensional microporous framework structure of $MA_2$ units, where A is sulfur or selenium and having the empirical formula expressed in molar ratios: $xR:MA_{2\pm0.2}:zH_2O$ where R represents at least one organic templating agent present in the intracrystalline pore system, x has a value greater than 0 to about 1.0, z has a value of 0 to about 4.0 and M is germanium, tin, or a combination thereof.

One specific embodiment is a metal sulfide having the empirical formula $0.31\ TEA:GeS_{1.9}:0.39H_2O$ where TEA is tetraethylammonium.

Another embodiment of the invention is a crystalline composition having the empirical formula expressed in molar ratios: $xR:M_{1-y}M'_yA_{2\pm0.2}:zH_2O$ where y is greater than 0 to about 0.5 and M' is a metal that meets the criteria: (a) occurs in sulfide or selenide minerals of hydrothermal origin; (b) exhibits stable aqueous thiometallate or selenometallate chemistry or forms stable bisulfide or biselenide complexes and (c) gives a minimum framework charge from about 0 to about $-1$ per metal atom in a $M_{1-y}M'_yA_{2\pm0.2}$ framework structure.

Another specific embodiment is a metal sulfide having the empirical formula $0.3\ TEA:Ge_{0.84}Co_{0.16}S_2:1.0\text{-}H_2O$.

Yet another embodiment is a process for preparing a crystalline composition having a three-dimensional microporous framework structure of $MA_2$ units where A is sulfur or selenium and having the empirical formula expressed in molar ratios: $xR:MA_{2\pm0.2}:zH_2O$ where R represents at least one organic templating agent present in the intracrystalline pore system, x has a value of greater than 0 to about 1, z has a value of 0 to about 4 and M is germanium, tin, or a combination thereof comprising reacting a mixture of the templating agent, an anion, a metal sulfide or metal selenide, and water at a temperature, pressure and time sufficient to form the crystalline composition, the reaction mixture composition expressed in terms of molar ratios is: $pRY:(MA_2):mH_2O$ where p has a value greater than 0 to about 5, m has a value from about 10 to about 500, and Y is at least one anion present in sufficient quantity to balance the charge on R.

Yet another specific embodiment is a process for preparing a crystalline microporous germanium sulfide comprising forming a reaction mixture of tetraethylammonium bicarbonate, (TEA $HCO_3$), germanium sulfide ($GeS_2$) and water in the ratio of 0.53 $TEAHCO_3$:$GeS_2$:$15H_2O$, heating the mixture at a temperature of 150° C. at autogenous pressure for 23 hours to give a crystalline microporous germanium sulfide having the empirical formula 0.31 TEA: $GeS_{1.9}$:$0.39H_2O$.

A further embodiment is a process for preparing a crystalline composition having the empirical formula expressed in molar ratios: $xRY:M_{1-y}M'_yA_{2\pm0.2}:zH_2O$ comprising reacting a mixture of the templating agent, an anion, a metal sulfide or selenide and water at a temperature, pressure and time sufficient to form the crystalline composition, the reaction mixture composition expressed in terms of molar ratios is: $aRY:MA_2:cM'X:dH_2O$, where M'X represents a compound of a metal, the metal (M') meeting the criteria (a) occurs in sulfide or selenide minerals of hydrothermal origin; (b) exhibits stable aqueous thiometallate or selenametallate chemistry or forms stable bisulfide or biselenide complexes and (c) gives a minimum framework charge from about 0 to about $-1$ per metal atom in a $M_{1-y}M'_yA_{2\pm0.2}$ framework structure, a has a value greater than 0 to about 5, c has a value greater than 0 to about 1, d has a value from about 10 to about 500, and Y is at least one anion present in sufficient quantity to balance the charge on R.

Other objects and embodiments will become more apparent after a more detailed description of the invention.

DETAILED DESCRIPTION OF THE INVENTION

As stated, the instant invention relates to crystalline compositions having a three-dimensional microporous structure and a method of preparing the crystalline compositions. The crystalline compositions of the instant invention have a three-dimensional microporous framework structure of $MA_2$ units and have the empirical formula expressed in molar ratios: $xR:MA_{2\pm0.2}:zH_2O$ where A is sulfur or selenium, R is at least one organic templating agent (as described in detail below) present in the intracrystalline pore system, M is germanium, tin, or a combination thereof, x has a value of greater than 0 to about 1, preferably from about 0.1 to about 0.6 and especially from about 0.25 to about 0.42, and z has a value of 0 to about 4 and preferably from about 0.2 to about 1.2. It is also within the scope of this invention that part of the germanium or tin may be replaced by other metals to give a crystalline three-dimensional microporous structure having the empirical formula $xR:M_{1-y}M'_yA_{2\pm0.2}:zH_2O$ where A, x, R, M and z are as defined above, y has a value greater than 0 to about 0.5 and preferably greater than 0 to about 0.35, and M' is a metal that (a) occurs in sulfide or selenide minerals formed from hot aqueous solutions; (b) forms stable aqueous thiometallate or selenometallate compounds or forms stable bisulfide or biselenide complexes and (c) gives a minimum framework charge from about 0 to about $-1$ per metal atom in a $M_{1-y}M'_yA_{2\pm0.2}$ framework structure.

By way of further explanation, M' may be selected from those metals which are found in sulfide and/or selenide minerals of hydrothermal origin. (See generally D. J. Vaughan, J. R. Craig, MINERAL CHEMISTRY OF METAL SULFIDES, Cambridge University Press (1978)). By hydrothermal is meant hot aqueous solutions. Thus, hydrothermal origin means minerals formed in or from hot aqueous solutions. In particular those metals which are found in thio and/or selenospinels and in defect structures or superstructures related to sphalerite and wurtzite. Alternatively, those metals which have been experimentally shown to transport as thiometallate anions and/or as bisulfide complexes in aqueous or hydrothermal systems can also be used. The metals must also form stable aqueous thiometallate or selenometallate compounds or alternatively form stable bisulfide or biselenide complexes. By stable is meant that the compounds do not oxidize or react with air or undergo substantial hydrolysis within the time frame of the reaction. These metals are well known to those skilled in the art of chalcogenide chemistry and mineralogy. Illustrative of the metals which meet the above critera are thallium, silver, lead, mercury, chromium, arsenic, antimony, indium, molybdenum, tungsten, cobalt, zinc, copper, manganese, iron, nickel, cadmium and gallium. Preferred metals may be selected from the group consisting of molybdenum, tungsten, arsenic, antimony, indium, cobalt, zinc, manganese, iron, nickel, copper, cadmium and gallium while especially preferred metals may be selected from the group consisting of cobalt, zinc, manganese, iron, nickel, copper, cadmium and gallium.

The coordination environment of germanium in microporous sulfides and selenides is tetrahedral, which has been confirmed by the X-ray structural solution of a single crystal of the tetrahedral framework material TMA-MnCoGS-2 prepared as in Example 33. In those metallothiogermanates which contain incorporated metals as well as in thiostannates and metallothiostannates, the Sn and incorporated metals may assume 3, 4, 5 or 6 coordination based on the known crystal chemistry of chalcogenide materials.

The metal sulfide compositions are generally synthesized by hydrothermal crystallization for an effective time at an effective pressure and temperature from a reaction mixture containing a metal sulfide, a templating agent, water and an anion. The templating agent is a structure-directing agent and is chosen to be a compound of an element of Group VA of the Periodic Table of the Elements, particularly nitrogen, phosphorous, arsenic and antimony, preferably nitrogen or phosphorus and most preferably nitrogen where such compounds also contain at least one alkyl or aryl group having from 1 to 8 carbon atoms. Particularly preferred compounds for use as templating agents are the amines, quaternary phosphonium compounds and quaternary ammonium compounds, the latter two being represented generally by the formula $R_4Z^+$ wherein "Z" is nitrogen or phosphorus and each R is an alkyl or aryl group containing from 1 to 8 carbon atoms. Polymeric quaternary ammonium salts such as $[(C_{14}H_{32}N_2)(OH)_2]_x$ wherein "x" has a value of at least 2 are also suitably employed. The mono-, di-and tri-amines are advantageously utilized, either alone or in combination with a quaternary ammonium compound or other templating compound. Mixtures of two or more templating agents can either produce mixtures of the desired metal sulfides or the more strongly directing templating species may control the course of the reaction with the other templating agents serving primarily to establish the pH conditions of the reaction gel. Representative templating agents include: tetramethylammonium ions, tetraethylammonium ions, tetrapropylammonium ions, tetrabutylammonium ions, tetrapentylammonium ions, di-n-propylamine, ethylbutylamine, tripropylamine, triethylamine, triethanolamine, piperidine, cyclohexylamine, 2-methylpyridine, N,N-dimethylbenzylamine, N,N-dimethylethanolamine, choline, N,N'-dimethylpiperazine, 1,4-diazabicyclo(2,2,2,)octane, N-methyldiethanolamine, N-methylethanolamine, N-methylpiperidine, 3-methyl-piperidine, N-methylcyclohexylamine, 3-methylpyridine, 4-methylpyridine, quinuc-lidine, N,N'-dimethyl-1,4-diazabicyclo(2,2,2-,)octane ion, di-n-butylamine, neopentylamine, di-n-pentylamine, diisopropylamine, t-butylamine, ethylenediamine, pyrrolidine, and 2-imidazolidone. Not every templating agent will direct the formation of every species of metal sulfides, i.e., a single templating agent can, with proper manipulation of the reaction conditions, direct the formation of several metal sulfide compositions, and a given metal sulfide composition can be produced using several different templating agents.

It is also necessary that the reaction mixture contain an anion (Y) selected from the group consisting of bisulfides, sulfides, halides, acetates, sulfates, hydroxides, bicarbonates and mixtures thereof with bicarbonates, bisulfides and hydroxides being preferred. Usually the anion is present as the counter ion of the templating agent, although it may be added in a form separate from the templating agent. For example if the desired templating agent is the tetramethylammonium cation, it may be added as the tetramethylammonium bicarbonate, chloride or hydroxide or as a mixture of tetramethylammonium chloride and sodium bicarbonate. The amount of anion present is the amount necessary to balance the charge on R (templating agent).

The germanium or tin sulfide which is present in the reaction mixture may be either crystalline or amorphous with the amorphous phase preferred.

The selenogermanates and selenostannates may be prepared in a manner similar to the sulfide compositions. Precursors for selenides include $GeSe_2$ and $SnSe_2$. Similar templating systems, such as alkylammonium or arylammonium bicarbonates, biselenides, selenides and hydroxides may be utilized. Thioselenogermanates and thioselenostannates may be prepared by using appropriate combinations of $GeS_2$, $GeSe_2$, $SnS_2$, $SnSe_2$, along with soluble metal salts if further incorporated elements are desired. As an alternative $GeSe_2$ and/or $SnSe_2$ may be digested with alkyl ammonium or aryl ammonium sulfides or bisulfides to produce thioseleno frameworks.

A portion of the germanium or tin framework may be replaced by one or more metals (M') which meet the criteria set forth above. Illustrative of the metals which meet these criteria are thallium, silver, lead, mercury, chromium, arsenic, antimony, indium, molybdenum, tungsten, cobalt, zinc, copper, manganese, iron, nickel, cadmium and gallium. Preferred metals may be selected from the group consisting of molybdenum, tungsten, arsenic, antimony, indium, cobalt, zinc, manganese, iron, nickel, copper, cadmium and gallium, while especially preferred metals may be selected from the group consisting of cobalt, zinc, manganese, iron, nickel, copper, cadmium and gallium.

When one or more of these metals is desired to be present in the final composition, they may be added to the reaction mixture in the form of a water soluble compound. Illustrative of the compounds which can be used are cobalt acetate, zinc acetate, manganese acetate, iron acetate, nickel acetate, copper acetate, cadmium acetate, gallium acetate, chromium acetate, lead acetate, mercury acetate, silver acetate, thallium acetate, cobalt chloride, zinc chloride, manganese chloride, iron chloride, nickel chloride, copper chloride, cadmium chloride, gallium chloride, chromium chloride, indium chloride, mercury chloride, thallium chloride, antimony trichloride, arsenic trichloride, cadmium sulfate and gallium sulfate.

The composition of the reaction mixture will determine the composition of the crystalline product. The composition of the reaction mixture expressed in terms of molar ratios is: $pRY:MA_2:mH_2O$ where p has a value greater than 0 to about 5 and preferably from about 0.5 to about 4, m has a value from about 10 to about 500 and preferably from about 10 to about 200, and Y is at least one anion present in sufficient quantity to balance the charge on R. Further, when one or more metal is to be substituted for germanium or tin, the reaction mixture composition is: $aRY:MA_2:cM'X:dH_2O$, where M'X represents a compound of a metal which meets the criteria set forth above, a has a value greater than 0 to about 5 and preferably from about 0.5 to about 4, c has a value greater than 0 to about 1 and preferably greater than 0 to about 0.5 and d has a value from about 10 to about 500 and preferably from about 10 to about 200.

The reaction mixture described above is generally placed in a sealed pressure vessel, preferably lined with an inert plastic material such as polytetrafluoroethylene and heated, preferably under autogenous pressure at a temperature between 25° and 250° C. and preferably between 100° and 200° C. for a time of about 2 hours to about 20 days but typically from about 12 hours to about 5 days. The crystalline product which is obtained may be recovered by any convenient method such as centrifugation or filtration. The recovered product is then dried in air. It is also desirable to wash the product with distilled or acidified water prior to drying it.

Because of the use of an aqueous reaction medium, under certain circumstances the resultant product may contain a small fraction of germanium or tin (IV) oxide as the result of hydrolysis. In order to minimize this impurity, it is preferred to add to the reaction mixture from about 5 to 25 percent (as percent of total R) quarternary ammonium or alkylammonium hydrogen sulfide and/or quarternary ammonium or alkylammonium thiogermanate or thiostannate solution.

In some cases it is also desirable to add an alcohol to the slurry as an adjunct space-filling moiety. The alcohol takes the place of some of the alkylammonium or arylammonium templates in the structural voids, and this enhances formation of certain lower charged framework compositions. Illustrative of the alcohols which may be used are isopropanol, t-butanol, n-propanol, sec-butanol and iso-butanol. The amount of alcohol which will be present in the final crystalline composition will vary from about 1 to about 50% of the moles of R present.

As indicated, the crystalline microporous composition has present in the intracrystalline pore system at least one templating agent. A fraction of this templating agent may be removed by heating the metal sulfide or selenide product at a temperature of about 150° to about 300° C. for a time of about 0.5 to about 12 hours. Further, calcination at higher temperatures, e.g., 350° to about 500° C. will completely remove the template. The product which results from calcination at these higher temperatures may be crystalline or may be amorphous with some residual short range order. These calcined materials are useful as catalysts or catalyst supports.

The metal sulfides obtained from the above procedure are crystalline materials as shown by X-ray diffraction and their microporosity has been verified by chemical analysis which shown S/Ge ratios of 1.8 to 2.2 and the presence of large amounts of occluded organic template and water. Additionally, their microporosity has been verified by single crystal diffraction analysis of TMA-MnCoGS-2 which shows that the crystal has a void volume of about 50% and a pore diameter of about 6 Å. Further evidence of the microporosity of these materials is the observation that these materials reversibly adsorb compounds such as $CO_2$ and $H_2O$.

The crystalline microporous compositions of the present invention either as synthesized or after calcination can be used as catalysts or catalyst supports in a hydrocarbon conversion process. Hydrocarbon conversion processes are well known in the art and include cracking, hydrocracking, alkylation of both aromatics and isoparaffin, isomerization, polymerization, reforming, hydrogenation, dehydrogenation, transalkylation, dealkylation, hydration, dehydration, hydrotreating, hydrodenitrogenation, hydrodesulfurization, methanation and syngas shift process. Specific reaction conditions and the types of feeds which can be used in these processes are set forth in U.S. Pat. No. 4,310,440 and 4,440,871 which are incorporated by reference. Preferred hydrocarbon conversion processes are those in which hydrogen is a component such as hydrotreating or hydrofining, hydrogenation, hydrocracking, hydrodenitrogenation, hydrodesulfurization, etc.

In order to more fully illustrate the variety of species to be derived from the instant invention, the following examples are set forth. It is to be understood that the examples are only by way of illustration and are not intended as an undue limitation on the broad scope of the invention as set forth in the appended claims.

To allow for ready reference, the different structure types of thiogermanates, metallothiogermanates and thiostannates in the following examples have been given arbitray numbers and acronyms, with the germanium-containing compositions being numbered structure types 1 through 11 and the tin containing compositions being numbered 1 through 4 as in the following examples: TMA-GS-4, where TMA represents the tetramethylammonium template and GS-4 represents the germanium sulfide framework of structure type 4, TMA-CuMnGS-2 represents a TMA template-containing copper manganese germanium sulfide framework of structure type 2, and TMA-SnS-1 represents a TMA template-containing tin sulfide framework with thiostannate structure type 1.

Where the products are subjected to X-ray analysis, the X-ray patterns are obtained using standard X-ray powder diffraction techniques. The radiation source is a high-intensity, copper target, X-ray tube operated at 50 Kv and 40 ma. The diffraction pattern from the copper K-alpha radiation and graphite monochromator is suitably recorded by an X-ray spectrometer scintillation counter, pulse height analyzer and strip chart recorder. Flat compressed powder samples are scanned at 2° (2 theta) per minute, using a two second time constant. Interplanar spacings (d) in Angstrom units are obtained from the position of the diffraction peaks expressed as $2\ominus$ where $\ominus$ is the Bragg angle as observed on the strip chart. Intensities are determined from the heights of diffraction peaks after subtracting background, "$I_o$" being the intensity of the strongest line or peak, and "I" being the intensity of each of the other peaks.

Alternatively, the X-ray patterns are obtained from the copper K-alpha radiation by use of computer based techniques using a Siemens D-500 X-ray powder diffractometer, Siemens Type K-805 X-ray sources, available from Siemens Corporation, Cherry Hill, N.J., with appropriate computer interface.

As will be understood by those skilled in the art the determination of the parameter 2 theta is subject to both human and mechanical error, which in combination can impose an uncertainty of about 0.4 on each reported value of 2 theta. This uncertainty is, of course, also manifested in the reported values of the d-spacings, which are calculated from the 2 theta values. This imprecision is general throughout the art and is not sufficient to preclude the differentiation of the present crystalline materials from each other and from the compositions of the prior art. In some of the X-ray patterns reported, the relative intensities of the d-spacings are indicated by the notations vs, s, m, and w which represent very strong, strong, medium, and weak, respectively. In terms of $100 \times I/I_o$, the above designations are defined as w=0–15; m=15–60; s=60–80 and vs=80–100.

In certain instances the purity of a synthesized product may be assessed with reference to its X-ray powder diffraction pattern. Thus, for example, if a sample is stated to be pure, it is intended only that the X-ray pattern of the sample is free of lines attributable to crystalline impurities, not that there are no amorphous materials present.

The crystalline compositions of the instant invention may be characterized by their X-ray powder diffraction patterns and such may have one of the X-ray patterns set forth in the following Tables A through O.

TABLE A

| 2θ | d (Å) | 100 × I/I$_o$ |
|---|---|---|
| 6.02–6.05 | 14.61–14.68 | m–vs |
| 9.06–9.09 | 9.73–9.76 | s–vs |
| 10.07–10.09 | 8.77–8.78 | w–m |
| 11.74–11.76 | 7.52–7.54 | m–s |
| 13.88–13.89 | 6.37–6.38 | w–m |
| 18.38–18.47 | 4.80–4.83 | m |

TABLE B

| 2θ | d (Å) | 100 × I/I$_o$ |
|---|---|---|
| 8.92–9.32 | 9.50–9.90 | s–vs |
| 9.26–9.66 | 9.15–9.55 | s–vs |
| 12.01–12.51 | 7.07–7.37 | m–s |
| 14.35–14.85 | 5.97–6.17 | m–s |
| 14.74–15.24 | 5.81–6.01 | m–s |
| 28.72–29.52 | 3.02–3.12 | m–s |

TABLE C

| 2θ | d (Å) | 100 × I/I$_o$ |
|---|---|---|
| 10.22–10.69 | 8.28–8.64 | vs |
| 11.65–12.37 | 7.16–7.60 | w–m |
| 16.77–17.55 | 5.05–5.29 | w–m |
| 19.56–20.59 | 4.31–4.54 | m |

TABLE C-continued

| 2θ | d (Å) | 100 × I/I₀ |
|---|---|---|
| 27.62–28.51 | 3.13–3.23 | w–m |
| 31.04–32.27 | 2.77–2.88 | w |

TABLE D

| 2θ | d (Å) | 100 × I/I₀ |
|---|---|---|
| 7.15–7.21 | 12.26–12.37 | vs |
| 10.43–10.50 | 8.43–8.48 | w |
| 10.98–11.05 | 8.00–8.06 | m |
| 16.62–16.69 | 5.31–5.33 | m |
| 23.02–23.09 | 3.85–3.86 | w |
| 27.46–27.55 | 3.24–3.25 | w–m |

TABLE E

| 2θ | d (Å) | 100 × I/I₀ |
|---|---|---|
| 7.04–7.10 | 12.45–12.56 | w–m |
| 8.86–8.90 | 9.94–9.98 | vs |
| 10.79–10.83 | 8.17–8.20 | w–m |
| 11.99–12.03 | 7.35–7.38 | w–m |
| 19.42–19.45 | 4.56–4.57 | w–m |
| 28.98–29.02 | 3.03–3.13 | w–m |

TABLE F

| 2θ | d (Å) | 100 × I/I₀ |
|---|---|---|
| 5.19–5.22 | 16.94–17.04 | vs |
| 8.00–8.01 | 11.04–11.05 | w–s |
| 8.34–8.42 | 10.50–10.60 | m–s |
| 9.83–9.87 | 8.96–9.00 | w–s |
| 10.33–10.42 | 8.49–8.56 | m–s |
| 12.98–13.04 | 6.79–6.82 | m–s |

TABLE G

| 2θ | d (Å) | 100 × I/I₀ |
|---|---|---|
| 6.91–7.31 | 12.04–12.44 | m–s |
| 9.58–9.98 | 8.84–9.24 | s–vs |
| 9.94–10.34 | 8.58–8.88 | w–m |
| 15.56–16.16 | 5.49–5.69 | m |
| 17.89–18.59 | 4.78–4.94 | m |
| 27.33–28.13 | 3.17–3.27 | m |

TABLE H

| 2θ | d (Å) | 100 × I/I₀ |
|---|---|---|
| 6.22–6.30 | 14.02–14.22 | s–vs |
| 8.99–9.07 | 9.75–9.83 | s–vs |
| 10.90–10.98 | 8.06–8.12 | m–s |
| 11.10–11.31 | 7.82–7.97 | m–s |
| 12.50–12.56 | 7.05–7.08 | w–m |
| 29.88–29.95 | 2.98–2.99 | m–s |

TABLE I

| 2θ | d (Å) | 100 × I/I₀ |
|---|---|---|
| 7.54–7.94 | 11.22–11.62 | w–m |
| 9.34–9.38 | 9.43–9.47 | w–m |
| 10.38–10.48 | 8.44–8.52 | vs |
| 14.43–14.58 | 6.08–6.14 | w |
| 17.53–17.59 | 5.04–5.06 | w–m |
| 20.76–20.80 | 4.27–4.28 | w–m |

TABLE J

| 2θ | d (Å) | 100 × I/I₀ |
|---|---|---|
| 7.90–8.03 | 11.01–11.20 | w–m |
| 8.64–8.87 | 9.97–10.23 | vs |
| 11.74–11.94 | 7.41–7.54 | w |
| 17.40–17.74 | 5.00–5.10 | w |

TABLE J-continued

| 2θ | d (Å) | 100 × I/I₀ |
|---|---|---|
| 24.00–24.10 | 3.69–3.71 | w |
| 29.27–29.40 | 3.04–3.05 | w |

TABLE K

| 2θ | d (Å) | 100 × I/I₀ |
|---|---|---|
| 7.56–7.69 | 11.49–11.69 | m–s |
| 9.00–9.02 | 9.80–9.83 | m–vs |
| 11.09–11.10 | 7.97–7.98 | w |
| 12.86–12.89 | 6.87–6.88 | m–s |
| 15.40–15.45 | 5.73–5.75 | w–s |
| 16.03–16.14 | 5.49–5.53 | m–s |

TABLE L

| 2θ | d (Å) | 100 × I/I₀ |
|---|---|---|
| 7.97–8.03 | 11.02–11.10 | vs |
| 8.69–8.74 | 10.11–10.18 | w |
| 15.76–16.36 | 5.42–5.62 | w–m |
| 16.39–16.41 | 5.40–5.41 | w |
| 16.84–16.93 | 5.24–5.26 | w |
| 24.44–24.46 | 3.59–3.69 | w |

TABLE M

| 2θ | d (Å) | 100 × I/I₀ |
|---|---|---|
| 8.83–9.63 | 9.18–10.01 | vs |
| 14.15–15.08 | 5.87–6.26 | m–s |
| 17.69–19.22 | 4.62–5.01 | w–m |
| 21.97–23.45 | 3.79–4.05 | w–m |
| 28.96–30.17 | 2.96–3.08 | w–m |
| 37.04–38.56 | 2.33–2.43 | w |

TABLE N

| 2θ | d (Å) | 100 × I/I₀ |
|---|---|---|
| 11.02–11.42 | 7.73–8.03 | vs |
| 12.90–13.50 | 6.56–6.86 | w |
| 17.90–18.50 | 4.79–4.95 | m–s |
| 21.46–22.26 | 4.00–4.14 | m |
| 22.14–22.94 | 3.89–3.99 | m |
| 27.84–28.64 | 3.11–3.21 | m–s |

TABLE O

| 2θ | d (Å) | 100 × I/I₀ |
|---|---|---|
| 7.08–7.48 | 11.94–12.34 | vs |
| 8.91–9.31 | 9.50–9.90 | w–m |
| 10.49–10.89 | 8.12–8.42 | w–m |
| 10.82–11.22 | 7.89–8.19 | w |
| 12.63–13.23 | 6.70–7.00 | w |
| 16.47–17.17 | 5.17–5.37 | w |
| 27.32–28.12 | 3.17–3.27 | w |

EXAMPLE 1

Germanium sulfide was prepared by the following method. A 5 liter three-necked flask was charged with 2 liters of distilled water. To the water was slowly added 100 grams of $GeCl_4$ with magnetic stirring to give a white slurry. To the slurry was added 2 liters of concentrated reagent grade HCl and about 10 mL of reagent grade concentrated $H_2SO_3$ (sulfurous acid). The acidified slurry was vigorously stirred while $H_2S$ gas was bubbled through at a rate just faster than the mixture could absorb it. The bubbling was continued for a total of 5 hours, at which time no further $H_2S$ was being absorbed by the slurry.

The solid reaction product, a pearly white fine powder, was recovered by filtration on a medium porosity glass fritted filter, washed with slightly acidified (with HCl) water (2 liters) then methanol (400 mL), and dried under dynamic vacuum ($10^{-3}$ torr) overnight. Chemical analysis of the product indicated the presence of 7.5 weight percent Cl, 39.2 weight percent S and 49.1 weight percent Ge, giving a product composition of:

$GeS_{1.8}Cl_{0.31}$.

EXAMPLE 2

Tetraethylammonium (TEA) bicarbonate was made by bubbling $CO_2$ gas through 184 grams of 40% aqueous TEAOH until the temperature of the reaction mixture stabilized to room temperature. The resulting solution was diluted to 250.0 mL, giving a 2.0M solution of $TEAHCO_3$ suitable for use in the following examples where $TEAHCO_3$ is used. The bicarbonates of all other alkylammonium and quaternary ammonium salts were made in an analogous manner.

EXAMPLE 3

Preparation of TEA-GS-5
(TEA=tetraethylammonium).

A reaction mixture was prepared by combining 8.2 grams of $GeS_2$ (obtained from the Alfa Chemical Co.) and 15 mL of 2M $TEAHCO_3$ (from example 2 above). The composition of the reaction mixture was:

$0.5TEAHCO_3:1GeS_2:14H_2O$.

A portion of the slurry was sealed in a polytetrafluoroethylene (Teflon ™ ) lined stainless steel pressure vessel and digested at 150° C. for 90 hours at autogenous pressure. The solid reaction products were recovered by filtration, washed with water, and dried in air at room temperature. The major phase in the product had a powder diffraction pattern characterized by the data shown in Table 1. The product also contained <50% of crystalline $GeS_2$ starting material impurity.

TABLE 1

| 2Θ | d(Å) | 100 × I/I$_o$ |
|---|---|---|
| 6.03 | 14.66 | 50 |
| 9.06 | 9.76 | 29 |
| 10.06 | 8.80 | 6 |
| 11.74 | 7.54 | 9 |
| 12.08 | 7.33 | 5 |
| 13.90 | 6.37 | 4 |
| 18.47 | 4.80 | 6 |
| 23.63 | 3.76 | 5 |
| 28.02 | 3.18 | 3 |

EXAMPLE 4

Preparation of TEA-GS-5.

A reaction mixture was prepared by combining 2.0 grams of $GeS_2$ (made as in Example 1) and 4.0 mL of 2M $TEAHCO_3$ (made as in Example 2). The composition of the final reaction mixture was:

$0.53TEAHCO_3:1GeS_2:15H_2O$.

The mixture was momentarily stirred to form a slurry and sealed in a Teflon ™ -lined stainless steel pressure vessel and heated in an oven at 150° C. at autogenous pressure for 66 hours. The solid reaction product was recovered by filtration, washed with water, and dried in air at room temperature. The major phase in the product had an X-ray powder diffraction pattern represented by the data shown in Table 2. The product also contained minor amounts of $GeO_2$ and another crystalline impurity.

TABLE 2

| 2Θ | d(Å) | 100 × I/I$_o$ |
|---|---|---|
| 6.02 | 14.68 | 46 |
| 9.06 | 9.76 | 100 |
| 10.07 | 8.78 | 34 |
| 11.74 | 7.54 | 40 |
| 13.88 | 6.38 | 13 |
| 15.75 | 5.63 | 10 |
| 16.33 | 5.43 | 6 |
| 16.89 | 5.25 | 6 |
| 18.39 | 4.83 | 21 |
| 20.53 | 4.33 | 16 |
| 23.63 | 3.77 | 18 |
| 25.55 | 3.49 | 10 |
| 28.01 | 3.186 | 10 |
| 29.80 | 2.998 | 9 |

EXAMPLE 5 a. Preparation of Tetraethylammonium hydrogen sulfide.

In a 1 liter three-necked glass flask equipped with stirbar and gas-tight rubber caps, 368.2 grams of TEAOH was sealed in the flask along with approximately 20 mL of water. Hydrogen sulfide ($H_2S$) gas was bubbled through the solution through a stainless steel needle until the solution temperature had stabilized to room temperature. The solution was then diluted to 0.5 liter in a volumetric flask to give a final concentration of 2.0M TEAHS solution.

b. Preparation of Tetraethylammonium-thiogermanate.

A reaction mixture was prepared by combining 50.0 mL of 2M TEAHS (from Example 5a) with 6.8 grams of $GeS_2$ (from Alfa). The mixture was placed into a Teflon ™ -lined stainless steel pressure vessel and digested in an oven at 150° C. at autogenous pressure for 44 hours. The product was a yellow solution, a small amount of immiscible yellow liquid on top, and a small amount of white precipitate. The solution was filtered and the immiscible material pumped off under vacuum and then diluted to 250 mL to yield a TEA-thiogermanate reagent which was 0.4M in TEA+ and 0.2M in Ge.

EXAMPLE 6

Preparation of TEA-GS-5.

A reaction mixture was prepared by combining 2.0 grams of $GeS_2$ (made as in Example 1), 4.0 mL of 2M $TEAHCO_3$ (made as in Example 2) and 15.0 mL of TEA-thiogermanate solution (0.2M in Ge; made in Example 3b). The composition of the reaction mixture was:

$0.44TEAHCO_3:0.33TEAHS:1GeS_2:60H_2O$.

The mixture was placed into a Teflon ™ -lined stainless steel pressure vessel along with a 0.5 inch Teflon ™ -covered magnetic stirbar. The mixture was heated in a 100° C. oven and stirred at autogenous pressure for 66 hours. The solid reaction product was recovered by filtration, washed with water, and dried in air at room temperature. The X-ray powder diffraction pattern of this product, which contained no crystalline impurities, was characterized by the data shown in Table 3.

TABLE 3

| 2θ | d(Å) | 100 × I/I₀ |
|---|---|---|
| 6.05 | 14.61 | 100 |
| 9.09 | 9.73 | 97 |
| 9.47 | 9.33 | 18 |
| 10.09 | 8.77 | 45 |
| 11.76 | 7.52 | 61 |
| 13.89 | 6.37 | 19 |
| 15.80 | 5.61 | 14 |
| 16.37 | 5.41 | 13 |
| 16.94 | 5.24 | 8 |
| 18.34 | 4.83 | 29 |
| 20.44 | 4.35 | 6 |
| 21.11 | 4.21 | 4 |
| 23.65 | 3.76 | 32 |
| 24.12 | 3.69 | 7 |
| 25.50 | 3.49 | 6 |
| 25.73 | 3.46 | 8 |
| 28.03 | 3.18 | 16 |
| 29.27 | 3.052 | 8 |
| 29.84 | 2.994 | 9 |
| 30.42 | 2.938 | 6 |
| 31.91 | 2.805 | 4 |
| 33.62 | 2.666 | 6 |
| 35.74 | 2.512 | 5 |
| 37.51 | 2.398 | 5 |
| 37.98 | 2.369 | 5 |
| 48.01 | 1.895 | 5 |

EXAMPLE 7

Preparation of TEA-GS-5.

a. A reaction mixture was prepared by combining 2.0 grams of $GeS_2$ (made as in Example 1) and 4.0 mL of 2M $TEAHCO_3$ (made as in Example 2). The composition of the final reaction mixture was:

$$0.53 TEACHO_3 : 1 GeS_2 : 15 H_2O.$$

The mixture was momentarily stirred to wet the $GeS_2$ powder, sealed in a Teflon ™ -lined stainless steel pressure vessel, and then heated in an oven at 150° C. at autogenous pressure for 23 hours. The solid reaction product was recovered by filtration, washed with water, and dried in air at room temperature. A chemical analysis of the product indicated the presence of 15.6 weight percent C, 2.2 weight percent N, 41.2 weight percent Ge, 33.1 weight percent S, 4.2 weight percent $H_2O$, and 27.6 weight percent LOI, giving a product composition of:

$$0.28 TEA : GeS_{1.8} : 0.41 H_2O.$$

The above product had an X-ray powder diffraction pattern which showed the major product (>90%) to be essentially identical to the TEA-GS-5 product of Examples 3, 4 and 6 along with less than a 10% $GeO_2$ impurity.

b. A reaction mixture was prepared following the procedure of Example 7A except that the mixture was heated at 100° C. for 18 hours. The solid reaction product was recovered by filtration, washed with water, and dried in air at room temperature. A chemical analysis of the product indicated the presence of 17.3 weight percent C, 2.4 weight percent N, 39.4 weight percent Ge, 33.1 weight percent S, 3.8 weight percent $H_2O$, and 30.3 weight percent LOI, giving a product composition of:

$$0.31 TEA : GeS_{1.9} : 0.39 H_2O.$$

The above product had an X-ray powder diffraction pattern in which the major phase (>95%) was the TEA-GS-5 product of Example 3 along with a $GeO_2$ impurity (>5%).

EXAMPLE 8

Preparation of TEA-GS-5.

A reaction mixture was prepared by combining 2.0 grams of $GeS_2$ (Alfa) and 1.65 grams of 40% TEAOH which had previously been mixed with glacial acetic acid to give a TEA-acetate solution of pH 6-9. The mixture was stirred to wet the $GeS_2$, sealed in a Teflon ™ -lined stainless steel pressure vessel and heated in an oven at 150° C. for 66 hours. The solid reaction product was recovered by filtration, washed with water, and dried in air at room temperature. The X-ray powder diffraction pattern of the product showed the crystalline TEA-GS-5 product of Example 3 as the major phase, with crystalline $GeS_2$ starting material present as an impurity.

EXAMPLE 9

Preparation of TEA-GS-5.

a. A reaction mixture was prepared by combining 2.0 grams of $GeS_2$ (made according to Example 1), 4 mL of 2M $TEAHCO_3$ (made according to Example 2) and 1 mL of 1M TEAHS (made by further dilution of 2M TEASH made according to Example 5a). The mixture was stirred to wet the $GeS_2$ powder, giving a reaction slurry with a final composition of:

$$0.53 TEAHCO_3 : 0.06 TEASH : 1 GeS_2 : 18 H_2O.$$

The mixture was sealed in a Teflon ™ bottle and heated in an oven at 100° C. at autogenous pressure for 66 hours. The solid reaction product was recovered by filtration, washed with water, and dried in air at room temperature. The product had an X-ray powder diffraction pattern identical to the TEA-GS-5 product in Example 3, with a minor amount (>5%) of $GeO_2$ impurity.

b. A reaction mixture was prepared by combining 2.0 grams of $GeS_2$ (made as in Example 1), 4.0 mL of 2M $TEAHCO_3$ (made as in Example 2) in which had been dissolved 1.68 grams of TEABr. The mixture was stirred to wet the $GeS_2$ powder, sealed in a Teflon ™ -lined stainless steel pressure vessel, and heated in an oven at 100° C. at autogenous pressure for 18 hours. The solid product was recovered by filtration, washed with water, and dried in air at room temperature. The X-ray powder diffraction pattern of the product showed the major phase to be TEA-GS-5 (>85%), along with a minor portion of crystalline $GeO_2$ impurity.

EXAMPLE 10

Preparation of TMA-GS-4.
(TMA = tetramethylammonium).

a. A reaction mixture was prepared by combining 2.0 grams $GeS_2$ (made as in Example 1), 4.0 mL of 2M $TMAHCO_3$ (made according to Example 2), and 4.0 mL of $H_2O$. The final mixture had the composition:

$$0.53 TMAHCO_3 : 1 GeS_2 : 30 H_2O.$$

The mixture was stirred momentarily to wet the $GeS_2$, sealed in a Teflon ™ bottle and heated in an oven at 100° C. at autogenous pressure for 66 hours. The solid product was recovered by filtration, washed with water, and dried in air at room temperature. The major phase of the product had an X-ray powder diffraction pattern characterized by the data in Table 4. The product also contained minor amounts of crystalline $GeO_2$ as well as a very poorly crystalline impurity.

TABLE 4

| 2θ | d(Å) | 100 × I/$I_o$ |
|---|---|---|
| 9.14 | 9.68 | 83 |
| 9.47 | 9.34 | 100 |
| 11.60 | 7.63 | 9 |
| 12.27 | 7.21 | 32 |
| 14.58 | 6.08 | 19 |
| 14.95 | 5.93 | 16 |
| 18.38 | 4.83 | 11 |
| 19.02 | 4.67 | 18 |
| 21.52 | 4.13 | 8 |
| 22.55 | 3.94 | 7 |
| 23.42 | 3.80 | 9 |
| 29.12 | 3.067 | 21 |
| 48.68 | 1.870 | 14 | b. A reaction mixture was prepared by combining 2.0 grams of $GeS_2$ (made as in Example 1), 4.0 mL of 2M $TMAHCO_3$ (made according to Example 2), and 0.88 grams of TMACl, which was dissolved in the $TMAHCO_3$ solution before its addition to the $GeS_2$. The mixture was momentarily stirred to assure wetting of the $GeS_2$, the final composition being:

$0.53TMAHCO_3:0.53TMACl:1GeS_2:15H_2O.$

The mixture was sealed in a Teflon ™-lined stainless steel pressure vessel and heated in an oven at 100° C. at autogenous pressure for 162 hours. The solid reaction product was recovered by filtration, washed with water, and dried in air at room temperature. Chemical analysis showed the presence of 10.1 weight percent C, 3.0 weight percent N, 43.9 weight percent Ge, 39.5 weight percent S, 3.3 weight percent $H_2O$, and 25.8 weight percent LOl, giving a product composition of:

$0.35TMA:GeS_{2.0}:0.3H_2O.$

The major product had an X-ray powder diffraction pattern characterized by the data shown in Table 5. The product also contained a small amount (>5%) of $GeO_2$ impurity.

TABLE 5

| 2θ | d(Å) | 100 × I/$I_o$ |
|---|---|---|
| 9.12 | 9.70 | 100 |
| 9.46 | 9.35 | 76 |
| 11.60 | 7.63 | 21 |
| 12.26 | 7.22 | 37 |
| 14.60 | 6.07 | 25 |
| 14.99 | 5.91 | 21 |
| 16.08 | 5.51 | 6 |
| 18.34 | 4.84 | 7 |
| 18.99 | 4.67 | 23 |
| 21.51 | 4.13 | 19 |
| 22.53 | 3.95 | 8 |
| 23.35 | 3.81 | 14 |
| 29.12 | 3.067 | 29 |
| 34.34 | 2.612 | 7 |
| 36.36 | 2.471 | 5 |
| 45.06 | 2.012 | 4 |
| 47.11 | 1.929 | 3 |
| 48.63 | 1.872 | 11 |
| 54.54 | 1.683 | 3 |

EXAMPLE 11

Preparation of TMA-GS-2.

a. A reaction mixture was prepared by combining 2.0 grams of $GeS_2$ (made as in Example 1), 4.0 mL of 2M $TMAHCO_3$ (made according to Example 2) and 0.88 grams of TMACl which was dissolved in the $TMAHCO_3$ solution before addition to the $GeS_2$. The final mixture composition was:

$0.53TMAHCO_3:0.53TMACl:1GeS_2:15H_2O.$

The mixture was momentarily stirred to assure wetting of the $GeS_2$. The mixture was sealed in a Teflon ™-lined stainless steel pressure vessel and heated in an oven at 150° C. at autogenous pressure for 66 hours. The solid reaction product was recovered by filtration, washed with water, and dried in air at room temperature. Chemical analysis indicated the presence of 9.0 weight percent C, 2.2 weight percent N, 44.7 weight percent Ge, 39.8 weight percent S, 3.4 weight percent $H_2O$, and 20.5 weight percent LOl, giving a product composition of:

$0.26TMA:GeS_{2.0}:0.31H_2O.$

The major product had an X-ray powder diffraction pattern characterized by the data shown in Table 6. The product also contained a minor amount of $GeO_2$ and an unidentified crystalline impurity.

TABLE 6

| 2θ | d(Å) | 100 × I/$I_o$ |
|---|---|---|
| 10.42 | 8.49 | 100 |
| 11.90 | 7.44 | 18 |
| 13.59 | 6.51 | 6 |
| 16.07 | 5.52 | 7 |
| 17.12 | 5.18 | 8 |
| 19.96 | 4.45 | 22 |
| 28.11 | 3.175 | 11 |
| 29.31 | 3.047 | 4 |
| 30.33 | 2.947 | 4 |
| 31.44 | 2.846 | 8 | b. A reaction mixture identical to that of Example 11a was formulated and an additional 4 mL of $H_2O$ was added. The same type of reaction vessel was used, which was heated in an oven at 100° C. at autogenous pressure for 42 hours. The solid product, recovered, washed, and dried as in Example 11a, had an X-ray powder diffraction pattern which showed the major product (>95%) to be the TMA-GS-2 structure of Example 11a. The minor product had an X-ray pattern identifying it as the TMA-GS-4 structure as in Example 10.

EXAMPLE 12

Preparation of DPA-GS-7 (DPA=dipropylamine).

a. A reaction mixture was prepared by combining 2.0 grams of $GeS_2$ (made as in Example 1), and 4.0 mL of 2M $DPAHCO_3$ (made according to Example 2), with momentary stirring to wet the $GeS_2$. The mixture composition was:

$0.53DPAHCO_3:1GeS_2:15H_2O.$

The mixture was sealed in a Teflon ™-lined stainless steel pressure vessel and heated in an oven at 100° C. at autogenous pressure for 66 hours. The solid reaction products were recovered by filtration, washed with water, and dried in air at room temperature. Chemical analysis of the product indicated the presence of 15.2 weight percent C, 3.0 weight percent N, 41.0 weight percent Ge, 35.5 weight percent S, 3.5 weight percent $H_2O$ and 26.1 weight percent LOI, giving a final product composition of:

$$0.38DPA:GeS_{2.0}:0.34H_2O.$$

The above product had an X-ray powder diffraction pattern characterized by the data shown in Table 7. A minor amount of $GeO_2$ impurity was also present.

TABLE 7

| $2\Theta$ | d(Å) | $100 \times I/I_o$ |
|---|---|---|
| 7.15 | 12.37 | 100 |
| 9.80 | 9.02 | 8 |
| 10.43 | 8.48 | 9 |
| 10.98 | 8.06 | 20 |
| 12.87 | 6.88 | 7 |
| 16.62 | 5.33 | 24 |
| 18.47 | 4.80 | 3 |
| 23.02 | 3.86 | 8 |
| 23.17 | 3.84 | 7 |
| 23.54 | 3.78 | 4 |
| 24.73 | 3.60 | 3 |
| 27.46 | 3.25 | 10 |
| 28.07 | 3.18 | 7 |
| 33.62 | 2.665 | 7 | b. A reaction mixture was prepared using the same procedure as Example 12a except that 6.0 mL of 2M $DPAHCO_3$ was used, giving the following reaction mixture composition:

$$0.8DPAHCO_3:1GeS_2:22H_2O.$$

The reaction time and temperature was identical to Example 12a. The solid product was recovered by filtration, washed with water, and dried in air at room temperature. An X-ray powder diffraction pattern of the product showed the major component to be the DPA-GS-7 structure of Example 12a, with very minor amounts of $GeO_2$ and another crystalline impurity.

c. A reaction mixture was prepared in a manner identical to Example 12a except that 2.0 mL of 2M DPAH-$CO_3$ mixed with 2.0 grams of water were mixed with the $GeS_2$. The reactant composition was:

$$0.27DPAHCO_3:1GeS_2:15H_2O.$$

The mixture was sealed in a Teflon™-lined stainless steel pressure vessel and heated in an oven at 100° C. at autogenous pressure for 90 hours. The solid was recovered by filtration, washed with water, and dried in air at room temperature. X-ray diffraction analysis of the product powder showed the major product to be the DPA-GS-7 structure of Example 12a, along with small amounts of a poorly crystalline impurity and $GeO_2$.

EXAMPLE 13

Preparation of DPAHCl (dipropylammonium hydrochloride).

A reaction mixture was prepared by placing 101.2 grams of dipropylamine in a glass vessel and cooling it in an ice bath. To the amine there were added 250 mL of 4.0M HCl at a rate so as to keep the reaction mixture temperature below 40° C. The final mixture, once cooled to room temperature, was diluted to 500 mL to give a 2.0M solution of DPAHCl.

EXAMPLE 14

Preparation of DPA-GS-7 (DPA=dipropylamine).

a. A reaction mixture was prepared by combining 2.0 grams of $GeS_2$ (made as in Example 1), 4.0 mL of 2M $DPAHCO_3$ (made according to Example 2), and 4.0 mL of 2M DPAHCl (made in Example 13). The final reaction mixture composition was:

$$0.53DPAHCO_3:0.53DPAHCl:1GeS_2:30H_2O.$$

The mixture was sealed in a Teflon™-lined stainless steel pressure vessel and heated in an oven at 100° C. at autogenous pressure for 18 hours. The solid reaction products were recovered by filtration, washed with water, and dried in air at room temperature. A powder X-ray diffraction pattern of the product revealed that the major product was the DPA-GS-7 structure of Example 12a, characterized by the data shown in Table 8. Minor amounts of another crystalline phase and $GeO_2$ were present as impurities.

TABLE 8

| $2\Theta$ | d(Å) | $100 \times I/I_o$ |
|---|---|---|
| 7.21 | 12.26 | 100 |
| 9.87 | 8.97 | 7 |
| 10.50 | 8.43 | 10 |
| 11.05 | 8.00 | 20 |
| 12.95 | 6.84 | 7 |
| 16.69 | 5.31 | 25 |
| 18.53 | 4.79 | 3 |
| 23.09 | 3.85 | 9 |
| 23.27 | 3.82 | 8 |
| 23.62 | 3.77 | 4 |
| 24.81 | 3.59 | 3 |
| 27.55 | 3.24 | 13 |
| 28.15 | 3.17 | 8 |
| 33.71 | 2.659 | 7 |
| 34.63 | 2.590 | 3 | b. A reaction mixture was prepared by combining 2.0 grams of $GeS_2$ (made as in Example 1), 4.0 mL of 2M DPAHCl, 0.67 grams $NaHCO_3$, and 2.0 grams of $H_2O$. The mixture was stirred momentarily to wet the $GeS_2$, giving a mixture of final composition:

$$0.53DPAHCl:0.53NaHCO_3:1GeS_2:22H_2O.$$

The mixture was sealed in a Teflon™-lined stainless steel pressure vessel and heated in an oven at 100° C. at autogenous pressure for 66 hours. The solid reaction products were recovered by filtration, washed with water and dried in air at room temperature. An X-ray powder diffraction pattern of the product showed the major product to be the DPA-GS-7 structure of Example 12a, along with a minor amount of $GeO_2$ impurity.

c. A reaction mixture was prepared by combining 2.0 grams of $GeS_2$ (made in Example 1), 4.0 mL of 2.0M DPAHCl, 0.38 grams of $(NH_4)_2CO_3$, and 2.0 grams of $H_2O$. The mixture was stirred momentarily to wet the $GeS_2$, giving a mixture of final composition:

$$0.53DPAHCl:0.27(NH_4)_2CO_3:1GeS_2:22H_2O.$$

The mixture was sealed in a Teflon™-lined stainless steel pressure vessel and heated in an oven at 100° C. at autogenous pressure for 66 hours. The solid reaction products were recovered by filtration, washed with water and dried in air at room temperature. An X-ray powder diffraction pattern of the product showed the major product to be the DPA-GS-7 structure of Example 12a, along with a minor amount of $GeO_2$ impurity.

EXAMPLE 15

Preparation of DPA-GS-8 (DPA = dipropylamine).

a. A reaction mixture was prepared by combining 3.0 grams of $GeS_2$ (made as in Example 1) and 6.0 mL of 2M $DPAHCO_3$. The mixture was stirred momentarily to wet the $GeS_2$, giving a mixture of composition:

$0.54DPAHCO_3:1GeS_2:15H_2O$.

The mixture was sealed in a Teflon™-lined stainless steel pressure vessel and heated in an oven at 100° C. at autogenous pressure for 66 hours, cooled to room temperature and left sealed at room temperature for 500 hours. The solid reaction product was recovered by filtration, washed with water, and dried in air at room temperature. A chemical analysis of the product revealed the presence of 14.1 weight percent C, 2.8 weight percent N, 42.0 weight percent Ge, 33.9 weight percent S, 2.8 weight percent $H_2O$ and 23.6 weight percent LOI, giving a final product composition of:

$0.38DPA:GeS_{2.0}:0.24H_2O$.

The X-ray powder diffraction pattern of this product, which also contained a minor amount of $GeO_2$ impurity was characterized by the data shown in Table 9.

TABLE 9

| 2Θ | d(Å) | 100 × $I/I_o$ |
|---|---|---|
| 7.10 | 12.45 | 14 |
| 8.90 | 9.94 | 100 |
| 10.83 | 8.17 | 16 |
| 12.03 | 7.35 | 10 |
| 12.78 | 6.93 | 9 |
| 14.18 | 6.25 | 4 |
| 15.62 | 5.67 | 9 |
| 18.50 | 4.80 | 3 |
| 19.45 | 4.56 | 12 |
| 21.26 | 4.18 | 5 |
| 21.84 | 4.07 | 4 |
| 22.57 | 3.94 | 3 |
| 23.38 | 3.81 | 5 |
| 29.02 | 3.077 | 9 |
| 31.29 | 2.858 | 3 |
| 31.95 | 2.801 | 7 | b. A reaction mixture was prepared by combining 2.0 grams of $GeS_2$ (made as in Example 1), 4.0 mL of 2M $DAPHCO_3$, and 4.0 mL of 2M DPAHCl. The mixture composition was:

$0.53DPAHCO_3:0.53DPAHCl:1GeS_2:30H_2O$.

The mixture was sealed in a Teflon™-lined stainless steel pressure vessel along with a Teflon™ covered magnetic stir-bar and heated in an oven at 100° C. with stirring at autogenous pressure for 42 hours. The solid products were recovered by filtration, washed with water, and dried in air at room temperature. A chemical analysis of the product revealed the presence of 14.3 weight percent C, 2.7 weight percent N, 40.5 weight percent Ge, 35.3 weight percent S, 2.6 weight percent $H_2O$ and 25.5 weight percent LOI, giving a final product composition of:

$0.35DPA:GeS_{2.0}:0.26H_2O$.

The X-ray powder diffraction pattern of this product, which also contained a minor amount of $GeO_2$ impurity was characterized by the data shown in Table 10.

TABLE 10

| 2Θ | d(Å) | 100 × $I/I_o$ |
|---|---|---|
| 7.04 | 12.56 | 15 |
| 8.86 | 9.98 | 100 |
| 10.79 | 8.20 | 23 |
| 11.99 | 7.38 | 14 |
| 12.75 | 6.94 | 12 |
| 14.16 | 6.26 | 4 |
| 15.59 | 5.69 | 10 |
| 18.47 | 4.80 | 4 |
| 19.42 | 4.57 | 14 |
| 21.15 | 4.20 | 5 |
| 21.79 | 4.08 | 5 |
| 22.51 | 3.95 | 3 |
| 23.34 | 3.81 | 6 |
| 28.98 | 3.081 | 12 |
| 31.25 | 2.862 | 3 |
| 31.89 | 2.806 | 8 |
| 34.30 | 2.614 | 3 |

EXAMPLE 16

Preparation of TPA-GS-6 (TPA = tetrapropylammonium).

a. A reaction mixture was prepared by combining 2.0 grams of $GeS_2$ (made as in Example 1) and 4.8 mL of 1.67M $TPAHCO_3$ (made according to Example 2). The mixture was stirred momentarily to wet the $GeS_2$, giving a mixture of composition:

$0.53TPAHCO_3:1GeS_2:18H_2O$.

The mixture was sealed in a Teflon™-lined stainless steel pressure vessel and heated in an oven at 150° C. at autogenous pressure for 18 hours. The solid reaction products were recovered by filtration, washed with water, and dried in air at room temperature. A chemical analysis of the product revealed the presence of 19.4 weight percent C, 2.0 weight percent N, 39.0 weight percent Ge, 33.3 weight percent S, 4.3 weight percent $H_2O$ and 33.7 weight percent LOI, giving a final product composition of:

$0.27TPA:GeS_{1.9}:0.45H_2O$.

The major component of the product had an X-ray powder diffraction pattern characterized by the data shown in Table 11. A minor amount of $GeO_2$ impurity (as in Example 7a) was also present.

TABLE 11

| 2θ | d(Å) | 100 × $I/I_o$ |
|---|---|---|
| 5.19 | 17.04 | 100 |
| 6.75 | 13.10 | 9 |
| 8.00 | 11.05 | 56 |
| 8.34 | 10.60 | 71 |
| 9.83 | 9.00 | 81 |
| 10.33 | 8.56 | 75 |
| 10.99 | 8.05 | 10 |
| 11.94 | 7.42 | 8 |
| 12.43 | 7.11 | 14 |
| 12.98 | 6.82 | 35 |
| 14.63 | 6.06 | 46 |
| 15.49 | 5.72 | 37 |
| 15.94 | 5.56 | 24 |
| 19.52 | 4.55 | 10 |
| 21.50 | 4.13 | 15 |
| 24.48 | 3.64 | 18 |
| 28.70 | 3.110 | 6 |

TABLE 11-continued

| 2θ | d (Å) | 100 × I/I₀ |
|---|---|---|
| 29.85 | 2.993 | 12 |
| 30.45 | 2.935 | 12 |
| 31.22 | 2.865 | 14 | b. A reaction mixture was prepared by combining 2.0 grams of $GeS_2$ (made as in Example 1), 4.8 mL of 1.67M $TPAHCO_3$, and 1.65 grams of TPABr. The mixture was stirred momentarily to wet the $GeS_2$, giving a mixture of composition:

0.53TPAHCO₃:0.27TPABr:1GeS₂:18H₂O.

The mixture was sealed in a Teflon ™-lined stainless steel pressure vessel and heated in an oven at 150° C. at autogenous pressure for 18 hours. The solid reaction products were recovered by filtration, washed with water, and dried in air at room temperature. The above product had an X-ray powder diffraction pattern in which the major phase (>95%) was characterized by the data shown in Table 12. The minor impurity phase present was $GeO_2$.

TABLE 12

| 2θ | d (Å) | 100 × I/I₀ |
|---|---|---|
| 5.22 | 16.94 | 100 |
| 8.01 | 11.05 | 17 |
| 8.42 | 10.50 | 23 |
| 9.87 | 8.96 | 20 |
| 10.42 | 8.49 | 58 |
| 11.93 | 7.42 | 4 |
| 12.52 | 7.07 | 8 |
| 13.04 | 6.79 | 31 |
| 14.68 | 6.03 | 10 |
| 15.56 | 5.70 | 9 |
| 16.00 | 5.54 | 6 |
| 19.68 | 4.51 | 3 |
| 21.57 | 4.12 | 8 |
| 24.57 | 3.62 | 4 |
| 28.80 | 3.100 | 3 |
| 30.52 | 2.929 | 4 |
| 31.11 | 2.875 | 3 |

EXAMPLE 17

Preparation of CYC-GS-9. (CYC=cyclohexylamine).

A reaction mixture was prepared by combining 2.0 grams of $GeS_2$ (made as in Example 1) and 10.0 mL of 1M $CYCHCO_3$ (made according to Example 2). The mixture was stirred momentarily to wet the $GeS_2$, giving a mixture composition of:

0.67CYCHCO₃:1GeS₂:37H₂O.

The mixture was sealed in a Teflon ™-lined stainless steel pressure vessel and heated in an oven at 100° C. at autogenous pressure for 162 hours. The solid reaction product was recovered by filtration, washed with water, and dried in air at room temperature. A chemical analysis of the product revealed the presence of 15.7 weight percent C, 2.9 weight percent N, 37.2 weight percent Ge, 36.5 weight percent S, 7.3 weight percent $H_2O$ and 30.1 weight percent LOI, giving a final product composition of:

0.4CYCGeS₂.₂:0.79H₂O.

The above product had an X-ray powder diffraction pattern characterized by the data shown in Table 13. A minor amount of $GeO_2$ and another poorly crystalline impurity were also present.

TABLE 13

| 2θ | d (Å) | 100 × I/I₀ |
|---|---|---|
| 7.11 | 12.24 | 61 |
| 7.99 | 11.08 | 7 |
| 9.78 | 9.04 | 100 |
| 10.14 | 8.73 | 18 |
| 12.10 | 7.31 | 4 |
| 14.17 | 6.25 | 3 |
| 14.71 | 6.02 | 4 |
| 15.86 | 5.59 | 20 |
| 16.13 | 5.50 | 6 |
| 18.24 | 4.86 | 19 |
| 18.52 | 4.79 | 7 |
| 19.62 | 4.52 | 3 |
| 20.30 | 4.37 | 5 |
| 20.90 | 4.25 | 5 |
| 21.52 | 4.13 | 3 |
| 24.44 | 3.64 | 3 |
| 27.07 | 3.29 | 3 |
| 27.73 | 3.22 | 25 |
| 28.66 | 3.115 | 3 |
| 29.34 | 3.044 | 3 |
| 30.29 | 2.951 | 4 |
| 30.49 | 2.932 | 6 |
| 33.89 | 2.645 | 3 |
| 37.65 | 2.389 | 4 |
| 38.43 | 2.342 | 3 |

EXAMPLE 18

Preparation of QUI-GS-10. (QUI=quinuclidine).

a. A reaction mixture was prepared by combining 2.0 grams of $GeS_2$ (made as in Example 1) and 8.0 mL of 1M $QUIHCO_3$ (prepared according to Example 2). The mixture was stirred momentarily to wet the $GeS_2$, giving a mixture of composition:

0.53QUIHCO₃:1GeS₂:30H₂O.

The mixture was sealed in a Teflon ™-lined stainless steel pressure vessel and heated in an oven at 150° C. at autogenous pressure for 18 hours. The solid reaction product was recovered by filtration, washed with water, and dried in air at room temperature. The above product had an X-ray powder diffraction pattern characterized by the data shown in Table 14.

TABLE 14

| 2θ | d (Å) | 100 × I/I₀ |
|---|---|---|
| 6.22 | 14.22 | 100 |
| 8.99 | 9.83 | 83 |
| 10.90 | 8.12 | 46 |
| 11.10 | 7.97 | 41 |
| 11.28 | 7.84 | 39 |
| 12.50 | 7.08 | 28 |
| 15.61 | 5.68 | 15 |
| 17.63 | 5.03 | 20 |
| 18.81 | 4.72 | 41 |
| 21.30 | 4.17 | 8 |
| 24.87 | 3.58 | 14 |
| 26.54 | 3.36 | 9 |
| 29.88 | 2.991 | 43 |
| 34.19 | 2.623 | 9 | b. A reaction mixture was prepared by combining 2.0 grams of $GeS_2$ (made as in Example 1) and 12.0 mL of 1M $QUIHCO_3$. The mixture was stirred momentarily to wet the $GeS_2$, giving a mixture composition of:

0.8QUIHCO₃:1GeS₂:44H₂O.

The mixture was sealed in a Teflon ™-lined stainless steel pressure vessel and heated in an oven at 100° C. at autogenous pressure for 162 hours. The solid reaction product was recovered by filtration, washed with water, and dried in air at room temperature. Chemical analysis of the product revealed the presence of 19.8 weight percent C, 3.3 weight percent N, 34.9 weight percent Ge, 34.5 weight percent S, 10.2 weight percent $H_2O$ and 32.4 weight percent LOI, giving a final product composition of:

0.5QUI:$GeS_{2.2}$:1.2$H_2O$.

The X-ray powder diffraction pattern of the product was characterized by the data shown in Table 15.

TABLE 15

| 2 θ | d (Å) | 100 × $I/I_o$ |
|---|---|---|
| 6.30 | 14.02 | 64 |
| 9.07 | 9.75 | 100 |
| 9.93 | 8.91 | 9 |
| 10.98 | 8.06 | 57 |
| 11.31 | 7.82 | 47 |
| 12.56 | 7.05 | 11 |
| 15.27 | 5.80 | 9 |
| 15.89 | 5.58 | 16 |
| 17.69 | 5.01 | 19 |
| 18.92 | 4.69 | 21 |
| 21.26 | 4.18 | 5 |
| 25.42 | 3.50 | 8 |
| 25.70 | 3.47 | 9 |
| 26.64 | 3.35 | 6 |
| 29.95 | 2.984 | 40 |
| 34.34 | 2.611 | 7 |

EXAMPLE 19

Preparation of $SnS_2$.

A reaction mixture was prepared by combining 70.1 grams of $SnCl_4 5H_2O$ and 300 grams of $H_2O$. A separate solution of 111.4 grams of $Na_2SxH_2O$ (43.9% $H_2O$) and 300 grams of $H_2O$ was prepared. The $Na_2S$ solution was slowly added with stirring to the $SnCl_4$ solution, until precipitation of $SnS_2$ ceased, giving a solution of pH 7.6. About 2 mL of concentrated HCl were then added, bringing the final pH to 6.6. The wet golden-brown solid was dehydrated in a dessicator over $P_2O_5$.

EXAMPLE 20

Preparation of TMA-SnS-1
(TMA = tetramethylammonium).

a. A reaction mixture was prepared from 1.8 grams of $SnS_2$ (Alfa), 1.8 grams of TMAOH5$H_2O$ (Aldrich), and 5 grams of $H_2O$, to give a mixture composition of:

1TMAOH:1$SnS_2$:33$H_2O$.

The mixture was sealed in a Teflon ™-lined stainless steel pressure vessel and heated in an oven at 150° C. at autogenous pressure for 15 hours. The solid reaction product was recovered by filtration, washed with water, and dried in air at room temperature. The major product exhibited an X-ray diffraction pattern characterized by the data shown in Table 16. At least one other crystalline impurity was present in a minor amount.

TABLE 16

| 2 θ | d (Å) | 100 × $I/I_o$ |
|---|---|---|
| 7.74 | 11.42 | 5 |

TABLE 16-continued

| 2 θ | d (Å) | 100 × $I/I_o$ |
|---|---|---|
| 9.34 | 9.47 | 11 |
| 10.38 | 8.52 | 100 |
| 12.98 | 6.82 | 4 |
| 14.58 | 6.08 | 5 |
| 17.53 | 5.06 | 6 |
| 18.74 | 4.73 | 3 |
| 20.80 | 4.27 | 9 |
| 26.01 | 3.43 | 4 |
| 31.57 | 2.834 | 4 | b. A reaction mixture was prepared by combining 3.7 grams of $SnS_2$ (made as in Example 19) and 5.0 mL of 2M $TMAHCO_3$, giving a mixture composition of:

0.5$TMAHCO_3$:1$SnS_2$:14$H_2O$.

The mixture was sealed in a Teflon ™-lined stainless steel pressure vessel and heated in an oven at 150° C. at autogenous pressure for 65 hours. The solid reaction product was recovered by filtration, washed with water, and dried in air at room temperature. Chemical analysis of the product revealed the presence of 11.3 weight percent C, 3.3 weight percent N, 48.4 weight percent Sn, 27.8 weight percent S, giving a final product composition of:

0.58TMA:$SnS_{2.1}$:0.86$H_2O$.

The X-ray powder diffraction pattern of the product was characterized by the data shown in Table 17.

TABLE 17

| 2 θ | d (Å) | 100 × $I/I_o$ |
|---|---|---|
| 7.74 | 11.42 | 14 |
| 9.38 | 9.43 | 41 |
| 10.48 | 8.44 | 100 |
| 13.04 | 6.79 | 13 |
| 14.43 | 6.14 | 5 |
| 15.57 | 5.69 | 3 |
| 17.14 | 5.17 | 3 |
| 17.59 | 5.04 | 16 |
| 18.79 | 4.72 | 11 |
| 20.76 | 4.28 | 7 |
| 21.04 | 4.22 | 10 |
| 22.45 | 3.96 | 5 |
| 24.05 | 3.70 | 5 |
| 26.21 | 3.40 | 4 |
| 28.35 | 3.149 | 4 |
| 28.68 | 3.113 | 5 |
| 29.52 | 3.026 | 3 |
| 30.24 | 2.956 | 4 |
| 31.58 | 2.833 | 4 |
| 32.44 | 2.760 | 9 |
| 34.53 | 2.598 | 5 |
| 34.85 | 2.574 | 4 |
| 36.63 | 2.453 | 3 |
| 38.03 | 2.366 | 6 |
| 38.94 | 2.313 | 9 |
| 47.30 | 1.922 | 4 |

EXAMPLE 21

Preparation of TEA-SnS-2.
(TEA = tetraethylammonium).

a. A reaction mixture was prepared by combining 1.8 grams of $SnS_2$ (Alfa) and 10 mL of 2M TEASH (made as in Example 5a), giving a composition of:

2TEASH:1$SnS_2$:55$H_2O$.

The mixture was sealed in a Teflon TM-lined stainless steel pressure vessel and heated in an oven at 150° C. at autogenous pressure for 64 hours. The solid reaction product was recovered by filtration, washed with water, and dried in air at room temperature. The major product exhibited an X-ray diffraction pattern characterized by the data shown in Table 18. At least one other crystalline impurity was present in a minor amount.

TABLE 18

| $2\theta$ | d (Å) | $100 \times I/I_o$ |
|---|---|---|
| 5.82 | 15.18 | 4 |
| 7.90 | 11.20 | 40 |
| 8.64 | 10.23 | 100 |
| 10.86 | 8.14 | 3 |
| 11.74 | 7.54 | 13 |
| 14.30 | 6.19 | 3 |
| 15.13 | 5.86 | 3 |
| 15.91 | 5.57 | 5 |
| 17.40 | 5.10 | 7 |
| 17.74 | 5.00 | 4 |
| 18.15 | 4.89 | 4 |
| 18.65 | 4.76 | 4 |
| 19.16 | 4.63 | 5 |
| 23.73 | 3.75 | 5 |
| 24.00 | 3.71 | 5 |
| 28.75 | 3.106 | 3 |
| 29.27 | 3.051 | 3 | b. A reaction mixture was prepared by combining 3.7 grams of $SnS_2$ (made as in Example 19) and 5.0 mL of 2M $TEAHCO_3$, giving a composition of:

$0.5TEAHCO_3:1SnS_2:14H_2O$.

The mixture was sealed in a Teflon TM-lined stainless steel pressure vessel and heated in an oven at 150° C. at autogenous pressure for 65 hours. The solid reaction products were recovered by filtration, washed with water, and dried in air at room temperature. The major product exhibited an X-ray diffraction pattern characterized by the data shown in Table 19. At least one other crystalline impurity was present in a minor amount.

TABLE 19

| $2\theta$ | d (Å) | $100 \times I/I_o$ |
|---|---|---|
| 8.03 | 11.01 | 13 |
| 8.87 | 9.97 | 100 |
| 11.94 | 7.41 | 5 |
| 14.47 | 6.12 | 2 |
| 15.42 | 5.75 | 3 |
| 16.05 | 5.52 | 2 |
| 17.74 | 5.00 | 6 |
| 18.36 | 4.83 | 3 |
| 18.98 | 4.68 | 4 |
| 19.42 | 4.57 | 3 |
| 23.85 | 3.73 | 3 |
| 24.10 | 3.69 | 2 |
| 28.85 | 3.094 | 2 |
| 29.40 | 3.038 | 2 |

EXAMPLE 22

Preparation of TPA-SnS-3 (TPA=tetrapropylammonium).

a. A reaction mixture was prepared by combining 0.9 grams of $SnS_2$ (Alfa) and 10.0 mL of 1M TPASH (made as in Example 5a), giving a composition of:

$2TPASH:1SnS_2:110H_2O$.

The mixture was sealed in a Teflon TM-lined stainless steel pressure vessel and heated in an oven at 150° C. at autogenous pressure for 64 hours. The solid reaction products were recovered by filtration, washed with water, and dried in air at room temperature. The major product exhibited an X-ray diffraction pattern characterized by the data shown in Table 20. Minor amounts of two other crystalline phases were present in the product.

TABLE 20

| $2\theta$ | d (Å) | $100 \times I/I_o$ |
|---|---|---|
| 7.56 | 11.69 | 19 |
| 9.00 | 9.83 | 25 |
| 11.10 | 7.97 | 7 |
| 12.12 | 7.30 | 3 |
| 12.86 | 6.88 | 24 |
| 13.13 | 6.74 | 3 |
| 15.40 | 5.75 | 8 |
| 16.03 | 5.53 | 16 |
| 17.98 | 4.93 | 7 |
| 18.48 | 4.80 | 4 |
| 19.48 | 4.56 | 5 |
| 27.56 | 3.24 | 4 |
| 39.16 | 2.300 | 4 | b. A reaction mixture was prepared by combining 0.6 grams of $SnS_2$ (made as in Example 19) and 12.0 mL of TPASH made as in Example 5a, giving a composition of:

$3.7TPASH:1SnS_2:200H_2O$.

The mixture was sealed in a Teflon TM-lined stainless steel pressure vessel and heated in an oven at 150° C. at autogenous pressure for 65 hours. The solid reaction products were recovered by filtration, washed with water, and dried in air at room temperature. The X-ray diffraction pattern of the product was characterized by the data shown in Table 21.

TABLE 21

| $2\theta$ | d (Å) | $100 \times I/I_o$ |
|---|---|---|
| 7.69 | 11.49 | 30 |
| 9.02 | 9.80 | 100 |
| 11.09 | 7.98 | 4 |
| 12.11 | 7.31 | 5 |
| 12.89 | 6.87 | 74 |
| 13.15 | 6.73 | 4 |
| 15.45 | 5.73 | 79 |
| 16.14 | 5.49 | 58 |
| 18.06 | 4.91 | 5 |
| 18.74 | 4.74 | 11 |
| 19.36 | 4.58 | 18 |
| 20.13 | 4.41 | 5 |
| 20.46 | 4.34 | 3 |
| 20.90 | 4.25 | 5 |
| 23.24 | 3.83 | 5 |
| 24.33 | 3.66 | 3 |
| 25.06 | 3.55 | 6 |
| 31.05 | 2.880 | 5 |
| 31.47 | 2.842 | 4 |
| 32.52 | 2.754 | 13 |
| 35.74 | 2.512 | 5 |
| 36.51 | 2.461 | 4 |
| 37.50 | 2.398 | 4 |
| 39.22 | 2.297 | 29 |

EXAMPLE 23

Preparation of TPA-SnS-4.
(TPA = tetrapropylammonium).

a. A reaction mixture was prepared by combining 1.8 grams of $SnS_2$ (Alfa) and 5.1 grams of TPAOH (40%) and 12 grams of $H_2O$, giving a composition of:

$1TPAOH:1SnS_2:84H_2O$.

The mixture was sealed in a Teflon ™ -lined stainless steel pressure vessel and heated in an oven at 150° C. at autogenous pressure for 15 hours. The solid reaction products were recovered by filtration, washed with water, and dried in air at room temperature. The major product exhibited an X-ray diffraction pattern characterized by the data shown in Table 22. At least two other crystalline phases were also present as minor components.

TABLE 22

| 2 θ | d (Å) | 100 × I/I$_o$ |
|---|---|---|
| 7.97 | 11.10 | 100 |
| 8.69 | 10.18 | 8 |
| 10.45 | 8.47 | 5 |
| 12.99 | 6.81 | 3 |
| 16.06 | 5.52 | 16 |
| 16.39 | 5.41 | 8 |
| 16.84 | 5.26 | 4 |
| 23.47 | 3.79 | 2 |
| 24.44 | 3.64 | 4 |
| 29.44 | 3.033 | 3 |
| 32.57 | 2.749 | 3 | b. A reaction mixture was prepared by combining 3.7 grams of $SnS_2$ (made as in Example 19) and 12.0 mL of 1.67M $TPAHCO_3$ (made as in Example 2), giving a composition of:

$1TPAHCO_3:1SnS_2:33H_2O$.

The mixture was sealed in a Teflon ™ -lined stainless steel pressure vessel and heated in an oven at 150° C. at autogenous pressure for 66 hours followed by standing at room temperature for 1300 hours. The solid reaction products were recovered by filtration, washed with water, and dried in air at room temperature. The X-ray powder diffraction pattern of the product was characterized by the data shown in Table 23.

TABLE 23

| 2 θ | d (Å) | 100 × I/I$_o$ |
|---|---|---|
| 8.03 | 11.02 | 100 |
| 8.74 | 10.11 | 7 |
| 10.50 | 8.42 | 5 |
| 13.04 | 6.79 | 4 |
| 14.05 | 6.30 | 2 |
| 15.75 | 5.63 | 4 |
| 16.06 | 5.52 | 9 |
| 16.41 | 5.40 | 6 |
| 16.93 | 5.24 | 5 |
| 23.41 | 3.80 | 3 |
| 24.46 | 3.64 | 4 |
| 29.20 | 3.059 | 2 |
| 29.47 | 3.031 | 3 |

EXAMPLE 24

Preparation of TEA-CoGS-1
(TEA = tetraethylammonium).

a. A reaction mixture was prepared by combining 2.0 grams of $GeS_2$ (made as in Example 1), 0.37 grams of cobalt acetate $(Co(CH_3COO)_2 4H_2O$, and 6.0 mL of 2M $TEAHCO_3$ (made according to Example 2.) The mixture was stirred momentarily to wet the $GeS_2$ and cobalt salt, giving a final mixture composition of:

$0.8TEAHCO_3:1GeS_2:0.1Co(CH_3COO)_2:22H_2O$.

The mixture was sealed in a Teflon ™ -lined stainless steel pressure vessel and heated in an oven at 150° C. at autogenous pressure for 18 hours. The solid blue-green reaction product was recovered by filtration, washed with water, and dried in air at room temperature. An elemental analysis of the product revealed the presence of 14.4 weight percent C, 2.2 weight percent N, 31.5 weight percent Ge, 5.0 weight percent Co, 33.6 weight percent S, 9.7 weight percent $H_2O$, and 30.0 weight percent LOI, giving a final product composition of:

$0.3TEA:Ge_{0.84}Co_{0.16}S_{2.0}1.0H_2O$.

The X-ray powder diffraction pattern of the product was characterized by the data shown in Table 24.

TABLE 24

| 2 Θ | d (Å) | 100 × I/I$_o$ |
|---|---|---|
| 9.43 | 9.38 | 100 |
| 14.83 | 5.97 | 53 |
| 16.42 | 5.40 | 4 |
| 18.92 | 4.69 | 6 |
| 23.05 | 3.86 | 18 |
| 28.65 | 3.116 | 4 |
| 29.75 | 3.003 | 18 |
| 19.89 | 2.989 | 16 |
| 32.95 | 2.718 | 4 |
| 33.11 | 2.706 | 5 |
| 38.12 | 2.361 | 6 |
| 38.34 | 2.348 | 5 |
| 38.51 | 2.336 | 5 |
| 50.80 | 1.797 | 4 |

EXAMPLE 25

Preparation of DPA-CoGS-1 (DPA = dipropylamine).

A reaction mixture was prepared by combining 2.0 grams of $GeS_2$ (made as in Example 1), 0.37 grams of cobalt acetate $(Co(CH_3COO)_2 4H_2O)$ and 6.0 mL of 2M $DPAHCO_3$. The mixture was stirred momentarily to wet the $GeS_2$ and cobalt acetate, giving a final mixture composition of:

$0.8DPAHCO_3:1GeS_2:0.1Co(CH_3COO)_2:22H_2O$

The mixture was sealed in a Teflon ™ -lined stainless steel pressure vessel and heated in an oven at 150° C. at autogenous pressure for 66 hours. The solid reaction product was recovered by filtration, washed with water, and dried in air at room temperature. An elemental analysis of the product revealed the presence of 13.4 weight percrent C, 2.4 weight percent N, 32.7 weight percent Ge, 4.6 weight percent Co, 34.2 weight percent S, 8.4 weight percent $H_2O$, and 30.2 weight percent LOI, giving a final product composition of:

$0.32DPA:Ge_{0.85}Co_{0.15}S_{2.0}:0.88H_2O$

The X-ray powder diffraction pattern of the product was characterized by the following data shown in Table 25.

TABLE 25

| 2Θ | d (Å) | 100 × I/I₀ |
|---|---|---|
| 9.34 | 9.47 | 100 |
| 14.77 | 6.00 | 38 |
| 16.19 | 5.48 | 3 |
| 18.72 | 4.74 | 10 |
| 20.61 | 4.31 | 7 |
| 22.96 | 3.87 | 24 |
| 27.45 | 3.25 | 5 |
| 29.77 | 3.002 | 26 |
| 31.99 | 2.798 | 2 |
| 32.71 | 2.738 | 7 |
| 36.05 | 2.492 | 5 |
| 38.06 | 2.364 | 9 |
| 38.49 | 2.339 | 4 |
| 41.47 | 2.178 | 3 |
| 41.84 | 2.159 | 5 |
| 47.85 | 1.901 | 3 |
| 50.84 | 1.796 | 3 |

EXAMPLE 26

Preparation of DIPA-CoGS-1
(DIPA = diisopropylamine).

a. A reaction mixture was prepared by combining 2.0 grams of $GeS_2$ (made an in Example 1), 0.37 grams of cobalt acetate ($Co(CH_3COO)_2 4H_2O$), and 12.0 mL of 1M $DIPAHCO_3$, (made as in Example 2). The mixture was stirred momentarily to wet the reagents, giving a final mixture composition of:

$0.8DIPAHCO_3:1GeS_2:0.1Co(CH_3COO)_2:44H_2O$

The mixture was sealed in a Teflon TM-lined stainless steel pressure vessel and heated in an oven at 150° C. at autogenous pressure for 42 hours. The solid reaction product was recovered by filtration, washed with water, and dried in air at room temperature. An elemental analysis of the product revealed the presence of 6.2 weight percent C, 12 weight percent N, 32.8 weight percent Ge, 4.2 weight percent Co, 35.5 weight percent S, 6.4 weight percent $H_2O$, and 32.7 weight percent LOI, giving a final product composition of:

$0.16DIPA\text{-}Ge_{0.86}Co_{0.14}S_{2.12}:0.68H_2O$

The X-ray powder diffraction pattern of the product, which contained no crystalline impurities, was characterized by the following data shown in Table 26.

TABLE 26

| 2Θ | d (Å) | 100 × I/I₀ |
|---|---|---|
| 9.27 | 9.54 | 100 |
| 14.73 | 6.02 | 87 |
| 16.00 | 5.54 | 10 |
| 18.54 | 4.79 | 21 |
| 22.91 | 3.88 | 59 |
| 27.17 | 3.28 | 17 |
| 29.72 | 3.006 | 48 |
| 31.89 | 2.807 | 5 |
| 32.47 | 2.757 | 19 |
| 37.85 | 2.377 | 20 |
| 38.45 | 2.341 | 6 |
| 40.94 | 2.205 | 5 |
| 46.35 | 1.959 | 8 |
| 47.84 | 1.901 | 5 |
| 50.77 | 1.798 | 6 |
| 51.14 | 1.786 | 15 |
| 53.11 | 1.724 | 4 |

EXAMPLE 27

Preparation of TMA-CoGS-1
(TMA = tetramethylammonium).

a. A reaction mixture was prepared by combining 2.0 grams of $GeS_2$ (made as in Example 1), 0.37 grams of cobalt acetate ($Co(CH_3COO)_3 4H_2O$), and 6.0 mL of 2M $TMAHCO_3$, (made according to Example 2), and 0.44 grams of TMACl. The TMACl was dissolved in the bicarbonate solution which was then added to the solid ingredients, followed by momentary stirring to wet and mix the reagents, giving a final mixture composition of:

$0.8TMHCO_3:0.27TMACl:1GeS_2:0.1Co(CH_3COO)_2:22H_2O$

The mixture was sealed in a Teflon TM-lined stainless steel pressure vessel and heated in an oven at 150° C. at autogenous pressure for 18 hours. The solid reaction product was recovered by filtration, washed with water, and dried in air at room temperature. The X-ray powder diffraction pattern of the product was characterized by the following data shown in Table 27. The product also contained a small amount of $GeO_2$ impurity.

TABLE 27

| 2Θ | d (Å) | 100 × I/I₀ |
|---|---|---|
| 9.20 | 9.61 | 100 |
| 14.63 | 6.05 | 33 |
| 16.17 | 5.48 | 3 |
| 18.34 | 4.84 | 17 |
| 22.74 | 3.91 | 31 |
| 26.88 | 3.32 | 5 |
| 29.51 | 3.027 | 24 |
| 32.12 | 2.786 | 12 |
| 35.22 | 2.548 | 4 |
| 37.55 | 2.395 | 8 |
| 38.06 | 2.365 | 4 |
| 38.39 | 2.345 | 5 |
| 41.88 | 2.157 | 3 |
| 47.57 | 1.911 | 5 |
| 50.73 | 1.800 | 7 |
| 52.37 | 1.747 | 4 |
| 55.45 | 1.657 | 4 |

EXAMPLE 28

Preparation of TMA-ZnGS-1
(TMA = tetramethylammonium).

a. A reaction mixture was prepared by combining 2.0 grams of $GeS_2$ (made as in Example 1), 0.31 grams of zinc acetate ($Zn(CH_3COO)_2 2H_2O$), 6.0 mL of 2M $TMAHCO_3$, (made according to Example 2), and 0.44 grams of TMACl. The TMACl was dissolved in the bicarbonate solution before its addition to the remainder of the regents. The final mixture was stirred momentarily to wet and combine the reagents, giving a final mixture composition of:

$0.8TMAHCO_3:0.27TMACl:GeS_2:0.1Zn(CH_3COO)_2:22H_2O$.

The mixture was sealed in a Teflon TM-lined stainless steel pressure vessel and heated in an oven at 150° C. at autogenous pressure for 138 hours. The solid reaction product was recovered by filtration, washed with water, and dried in air at room temperature. The major phase in the product had an X-ray powder diffraction pattern was characterized by the data shown in Table 28. Minor amounts of at least one other crystalline phase were also present.

TABLE 28

| 2 Θ | d (Å) | 100 × I/I$_o$ |
|---|---|---|
| 9.16 | 9.66 | 100 |
| 14.58 | 6.07 | 33 |
| 16.18 | 5.48 | 4 |
| 18.28 | 4.85 | 20 |
| 22.66 | 3.92 | 35 |
| 26.76 | 3.33 | 7 |
| 29.42 | 3.036 | 26 |
| 32.02 | 2.796 | 16 |
| 35.12 | 2.555 | 5 |
| 37.44 | 2.402 | 8 |
| 38.27 | 2.352 | 6 |
| 40.63 | 2.221 | 3 |
| 47.12 | 1.929 | 3 |
| 47.49 | 1.914 | 5 |
| 50.58 | 1.805 | 8 |
| 52.23 | 1.751 | 4 |
| 55.32 | 1.661 | 4 |

EXAMPLE 29

Preparation of CYC-ZnGS-1
(CYC=cyclohexylamine).

a. A reaction mixture was prepared by combining 2.0 grams of GeS$_2$ (made as in Example 1), 0.31 grams of zinc acetate (Zn(CH$_3$COO)$_2$2H$_2$O), and 12.0 mL of 1M CYCHCO$_3$ (made according to Example 2.) The mixture was stirred momentarily to wet the reagents, giving a final mixture composition of:

0.8CYCHCO$_3$:1GeS$_2$:0.1Zn(CH$_3$COO)$_2$:44H$_2$O

The mixture was sealed in a Teflon TM -lined stainless steel pressure vessel and heated in an oven at autogenous pressure for 138 hours. The solid reaction products were recovered by filtration, washed with water, and dried in air at room temperature. An elemental analysis of the product revealed the presence of 13.5 weight percent C, 3.1 weight percent N, 35.4 weight percent Ge, 5.7 weight percent Zn, 36.5 weight percent S, 6.7 weight percent H$_2$O, and 23.6 weight percent LOI, giving a product composition of:

0.30CYC:Ge$_{0.85}$Zn$_{0.15}$S$_{2.0}$:0.65H$_2$O.

The product had an X-ray powder diffraction pattern characterized by the data shown in Table 29.

TABLE 29

| 2 Θ | d (Å) | 100 × I/I$_o$ |
|---|---|---|
| 9.03 | 9.79 | 100 |
| 9.90 | 8.93 | 15 |
| 14.40 | 6.15 | 31 |
| 16.04 | 5.53 | 4 |
| 17.99 | 4.93 | 13 |
| 22.37 | 3.97 | 25 |
| 26.38 | 3.38 | 8 |
| 27.33 | 3.26 | 3 |
| 29.04 | 3.075 | 24 |
| 29.36 | 3.043 | 5 |
| 31.12 | 2.874 | 6 |
| 31.57 | 2.834 | 11 |
| 34.57 | 2.595 | 4 |
| 36.95 | 2.433 | 7 |
| 37.84 | 2.378 | 4 |
| 46.93 | 1.936 | 5 |
| 49.96 | 1.826 | 4 |
| 51.37 | 1.779 | 3 |
| 54.72 | 1.677 | 3 |

EXAMPLE 30

Preparation of TEA-MnGS-1
(TEA=tetraethylammonium).

a. A reaction mixture was prepared by combining 2.0 grams of GeS$_2$ (made as in Example 1), 0.35 grams of manganese acetate (Mn(CH$_3$COO)$_2$4H$_2$O), and 6.0 mL of 2M TEAHCO$_3$ (made according to Example 2.) The mixture was stirred momentarily to wet the reagents, giving a final mixture composition of:

12TEAHCO$_3$:1GeS$_2$:0.1Mn(CH$_3$COO)$_2$:22H$_2$O

The mixture was sealed in a Teflon TM -lined stainless steel pressure vessel and heated in an oven at 150° C. at autogenous pressure for 18 hours. The solid reaction products were recovered by filtration, washed with water, and dried in air at room temperature. The major component of the product had an X-ray powder diffraction pattern characterized by the data shown in Table 30. A small amount of another crystalline impurity was also present.

TABLE 30

| 2 Θ | d (Å) | 100 × I/I$_o$ |
|---|---|---|
| 9.36 | 9.45 | 100 |
| 14.68 | 6.03 | 40 |
| 16.35 | 5.42 | 4 |
| 18.74 | 4.73 | 4 |
| 18.92 | 4.69 | 4 |
| 22.93 | 3.88 | 11 |
| 23.03 | 3.86 | 11 |
| 29.57 | 3.021 | 11 |
| 29.82 | 2.996 | 11 |
| 38.16 | 2.358 | 4 |

EXAMPLE 31

Preparation of TEA-CoMnGS-1
(TEA=tetraethylammonium).

a. A reaction mixture was prepared by combining 2.0 grams of GeS$_2$ (made as in Example 1), 0.18 grams of cobalt acetate (Co(CH$_3$COO)$_2$4H$_2$O), and 0.18 grams of manganese acetate (Mn(CH$_3$COO)$_2$4H$_2$O), 6.0 mL of 2M TEAHCO3 (made according to Example 2) and 0.84 grams of TEABr. The TEABr was dissolved in the bicarbonate solution, which was then added to the remainder of the reagents and stirred momentarily, giving the composition:

0.8TEAHCO$_3$:0.27TEABr:1GeS$_2$:0.05Co(CH$_3$COO)$_2$:0.05Mn(CH$_3$COO)$_2$:22H$_2$O

The mixture was sealed in a Teflon TM -lined stainless steel pressure vessel and heated in an oven at 100° C. at autogenous pressure for 114 hours. The solid reaction product was recovered by filtration, washed with water, and dried in air at room temperature. The X-ray powder diffraction pattern of the product, which contained no crystalline impurities, was characterized by the data shown in Table 31.

TABLE 31

| 2 Θ | d (Å) | 100 × I/I$_o$ |
|---|---|---|
| 9.38 | 9.43 | 100 |
| 14.78 | 5.99 | 55 |
| 16.46 | 5.38 | 3 |
| 18.89 | 4.70 | 5 |
| 23.01 | 3.86 | 18 |
| 27.79 | 3.21 | 3 |

TABLE 31-continued

| 2 Θ | d (Å) | 100 × I/I$_o$ |
| --- | --- | --- |
| 28.45 | 3.14 | 3 |
| 29.76 | 3.002 | 17 |
| 32.85 | 2.726 | 4 |
| 33.10 | 2.706 | 4 |
| 37.94 | 2.371 | 6 |
| 38.36 | 2.347 | 5 |
| 50.72 | 1.800 | 4 |

EXAMPLE 32

Preparation of TMA-CuGS-2.
(TMA=tetramethylammonium).

A reaction mixture was preapred by combining 2.0 grams of GeS$_2$ (made as in Example 1), 0.3 grams of copper acetate (Cu(CH$_3$COO)$_2$.H$_2$O), 6.0 mL of 2M TMAHCO$_3$ (made as in Example 2), and 0.44 grams of TMACl. The mixture was stirred momentarily to wet the reagents, giving a final mixture composition of:

0.8TMAHCO$_3$:0.27TMACl:1GeS$_2$:0.1Cu(CH$_3$COO)$_2$:22H$_2$O

The mixture was sealed in a Teflon TM -lined stainless steel pressure vessel and heated in an oven at 150° C. at autogenous pressure for 18 hours. The solid reaction product was recovered by filtration on a 44 micron stainless steel screen and the small amount of amorphous fines were washed away from the product with water. The product was dried in air at room temperature. An elemental analysis of the product revealed the presence of 11.5 weight percent C, 3.1 weight percent N, 39.0 weight percent Ge, 4.4 weight percent Cu, and 39.2 weight percent S, giving a final product composition of:

0.36TMA:Ge$_{0.89}$Cu$_{0.11}$S$_{2.0}$

The X-ray powder diffraction pattern of the product, which contained no crystalline impurities, was characterized by the following data shown in Table 32.

TABLE 32

| 2 Θ | d (Å) | 100 × I/I$_o$ |
| --- | --- | --- |
| 10.49 | 8.43 | 100 |
| 12.12 | 7.30 | 8 |
| 13.57 | 6.53 | 3 |
| 16.05 | 5.52 | 5 |
| 17.20 | 5.16 | 11 |
| 19.23 | 4.62 | 5 |
| 20.19 | 4.40 | 27 |
| 21.08 | 4.21 | 4 |
| 21.96 | 4.05 | 9 |
| 24.39 | 3.65 | 8 |
| 26.64 | 3.35 | 3 |
| 28.02 | 3.18 | 13 |
| 29.35 | 3.04 | 8 |
| 29.96 | 2.98 | 3 |
| 30.66 | 2.92 | 5 |
| 31.25 | 2.86 | 5 |
| 31.87 | 2.81 | 14 |
| 32.46 | 2.76 | 4 |
| 34.21 | 2.62 | 6 |
| 40.54 | 2.23 | 5 |
| 41.53 | 2.17 | 3 |

EXAMPLE 33

Preparation of TMA-MnCoGS-2.
(TMA=tetramethylammonium).

A reaction mixture was prepared by combining 10.0 grams of GeS$_2$ (made as in Example 1), 0.9 grams of manganese acetate (Mn(CH$_3$COO)$_2$.4H$_2$O), 0.9 grams of cobalt acetate (Co(CH$_3$COO)$_2$4H$_2$O), 30.0 mL of 2M TMAHCO$_3$ (made as in Example 2), and 2.2 grams of TMACl. The mixture was stirred momentarily to wet the reagents, giving a final mixture composition of:

0.8TMAHCO$_3$:0.27TMACl:1GeS$_2$:0.05Mn(CH$_3$COO)$_2$:0.05Co(CH$_3$COO)$_2$:22H$_2$O

The mixture was sealed in a Teflon TM -lined stainless steel pressure vessel and heated in an oven at 150° C. at autogenous pressure for 18 hours. The solid reaction product was recovered by filtration on a 44 micron stainless steel screen and the small amount of fines were washed away from the product with water. The product was dried in air at room temperature. An elemental analysis of the product revealed the presence of 11.3 weight percent C, 2.9 weight percent N, 39.0 weight precent Ge, 2.6 weight percent Mn, 1.2 weight percent Co, 39.4 weight percent S, 2.2 weight percent H$_2$O, and 22.2 weight percent LOI, giving a final product composition of:

0.39TMA Ge$_{0.89}$Mn$_{0.08}$Co$_{0.03}$S$_{2.0}$:0.2H$_2$O

As X-ray diffraction pattern of the product showed the major product (>95%) to possess an essentially identical diffraction pattern as the TMA-CuGS-2 product in Example 32.

EXAMPLE 34

Preparation of TMA-MnGS-3.
(TMA=tetramethylammonium).

A reaction mixture was prepared by combining 2.0 grams of GeS$_2$ (made as in Example 1), 0.72 grams of manganese acetate (Mn(CH$_3$COO)$_2$.4H$_2$O), 6.0 mL of 2M TMAHCO$_3$ (made as in Example 2), and 0.44 grams of TMACl. The mixture was stirred momentarily to wet the reagents, giving a final mixture composition of:

0.8TMAHCO$_3$:0.27TMACl:1GeS$_2$:0.2Mn(CH$_3$COO)$_2$:22H$_2$O

The mixture was sealed in a Teflon TM -lined stainless steel pressure vessel and heated in an oven at 150° C. at autogenous pressure for 18 hours. The solid reaction product was recovered by filtration, washed with water and dried in air at room temperature. An elemental analysis of the product revealed the presence of 11.6 weight percent C, 3.0 weight percent N, 35.4 weight percent Ge, 6.3 weight percent Mn, 36.3 weight percent S, 4.5 weight percent H$_2$O, and 23.6 weight percent LOI, giving a final product composition of:

0.40TMA:Ge$_{0.78}$Mn$_{0.22}$S$_{2.0}$:0.5H$_2$O

An X-ray powder diffraction pattern of the product, which contained no crystalline impurities, was characterized by the following data shown in Table 33.

TABLE 33

| 2 Θ | d (Å) | 100 × I/I₀ |
|---|---|---|
| 11.22 | 7.88 | 100 |
| 12.47 | 7.10 | 5 |
| 13.20 | 6.71 | 8 |
| 18.20 | 4.87 | 50 |
| 18.71 | 4.74 | 6 |
| 20.97 | 4.24 | 3 |
| 21.86 | 4.07 | 20 |
| 22.54 | 3.94 | 23 |
| 28.24 | 3.16 | 54 |
| 28.91 | 3.09 | 4 |
| 29.44 | 3.03 | 10 |
| 31.46 | 2.84 | 5 |
| 32.37 | 2.77 | 14 |
| 34.07 | 2.63 | 3 |
| 34.65 | 2.59 | 7 |
| 36.83 | 2.44 | 5 |
| 39.27 | 2.29 | 12 |
| 39.64 | 2.27 | 3 |
| 42.62 | 2.12 | 7 |
| 47.04 | 1.93 | 7 |
| 48.97 | 1.86 | 12 |
| 50.04 | 1.82 | 4 |
| 51.00 | 1.79 | 5 |
| 51.86 | 1.76 | 5 |
| 52.27 | 1.75 | 6 |

EXAMPLE 35

Preparation of TMA-FeGS-3 (TMA=tetramethylammonium).

A reaction mixture was prepared by combining 2.0 grams of $GeS_2$ (obtained from Alfa Chemical Co.), 0.26 grams of iron acetate ($Fe(CH_3COO)_2$), 6.0 mL of 2M $TMAHCO_3$ (made as in Example 2), and 0.44 grams of TMACl. The mixture was stirred momentarily to wet the reagents, giving a final mixture composition of:

$0.8TMAHCO_3:0.27TMACl:1GeS_2:0.1Fe(CH_3COO)_2:22H_2O$

The mixture was sealed in a Teflon TM-lined stainless steel pressure vessel and heated in an oven at 150° C. at autogenous pressure for 18 hours. The solid reaction product was recovered by filtration, washed with water, and dried in air at room temperature. An elemental analysis of the product revealed the presence of 11.8 weight percent C, 3.1 weight percent N, 30.7 weight percent Ge, 6.2 weight percent Fe, 36.9 weight percent S, and 7.2 weight percent H₂O, giving a final product composition of:

$0.41TMA:Ge_{0.79}Fe_{0.21}S_{2.0}:0.5H_2O$

An X-ray diffraction pattern of the product, which contains no crystalline impurities, was essentially identical to the diffraction pattern of the TMA-MnGS-3 product in Example 34.

EXAMPLE 36

Preparation of TMA-GaGS-1.
(TMA=tetramethylammonium).

A reaction mixture was prepared by combining 2.0 grams of $GeS_2$ (made as in Example 1), 0.92 grams of gallium sulfate ($Ga_2(SO_4)_3\cdot4H_2O$), 8.0 mL of 2M $TMAHCO_3$ (made as in Example 2), and 0.25 grams of isopropanol. The mixture was stirred momentarily to wet the reagents, giving a final mixture composition of:

$1.1TMAHCO_3:1GeS_2:0.12Ga_2(SO_4)_3:0.27i\text{-}PrOH:30H_2O$

The mixture was sealed in a Teflon TM-lined stainless steel pressure vessel and heated in an oven at 150° C. at autogenous pressure for 100 hours. The solid reaction product was recovered by filtration, washed with water, and dried in air at room temperature. The X-ray powder diffraction pattern of the product indicated the presence of approximately 10% crystalline $GeO_2$ which was accounted for when determining the composition based upon the chemical analysis. An elemental analysis of the product revealed the presence of 7.7 weight percent C, 1.9 weight percent N, 34.9 weight percent Ge, 9.0 weight percent Ga, 33.3 weight percent S, 6.0 weight percent H₂O, and 18.0 weight percent LOI, giving the following final product composition, assuming (moles Ga)+(moles Ge)=(0.5×moles S) in the sulfide framework and any excess Ge (9.2% excess) in the analysis may be attributed to $GeO_2$:

$0.26TMA:Ge_{0.75}Ga_{0.25}S_{2.0}:0.64H_2O:0.09GeO_2$

As X-ray powder diffraction pattern of the sulfide product was characterized by the following data shown in Table 34.

TABLE 34

| 2 Θ | d (Å) | 100 × I/I₀ |
|---|---|---|
| 9.19 | 9.62 | 100 |
| 14.62 | 6.06 | 32 |
| 16.16 | 5.49 | 3 |
| 18.42 | 4.82 | 12 |
| 22.75 | 3.91 | 24 |
| 27.00 | 3.30 | 5 |
| 29.55 | 3.02 | 22 |
| 32.27 | 2.77 | 8 |
| 35.53 | 2.53 | 2 |
| 35.98 | 2.50 | 2 |
| 37.61 | 2.39 | 6 |
| 38.33 | 2.35 | 5 |
| 47.61 | 1.91 | 5 |
| 50.68 | 1.80 | 5 |

EXAMPLE 37

Preparation of EBA-GS-11 (EBA=ethylbutylamine).

A reaction mixture prepared by combining 2.0 grams of $GeS_2$ (made as in Example 1) and 6.0 mL of 2M $EBAHCO_3$ (made as in Example 2). The mixture was stirred momentarily to wet the reagents, giving a final mixture composition of:

$0.8EBAHCO_3:1GeS_2:22H_2O$

The mixture was sealed in a Teflon TM-lined stainless steel pressure vessel and heated in an oven at 100° C. at autogenous pressure for 42 hours. The solid reaction product was recovered by filtration, washed with water, and dried in air at room temperature. The X-ray powder diffraction pattern of the product, which contained a minor amount of $GeO_2$ impurity, was characterized by the following data shown in Table 35.

TABLE 35

| 2 Θ | d (Å) | 100 × I/I₀ |
|---|---|---|
| 7.28 | 12.14 | 100 |
| 8.79 | 10.06 | 7 |
| 9.11 | 9.70 | 16 |
| 9.94 | 8.90 | 5 |
| 10.69 | 8.27 | 10 |

TABLE 35-continued

| 2 Θ | d (Å) | 100 × I/I$_o$ |
|---|---|---|
| 11.02 | 8.04 | 9 |
| 12.93 | 6.85 | 4 |
| 15.95 | 5.56 | 2 |
| 16.82 | 5.27 | 11 |
| 27.72 | 3.22 | 5 |
| 28.27 | 3.16 | 2 |
| 34.07 | 2.63 | 2 |

EXAMPLE 38

Adsorption capacities of TMA-SnS-1 were measured using a mercury-free McBain-BaKr gravimetric adsorption apparatus. The following data were obtained on a sample activated at 150° C.

| | Kinetic Diameter Å | Pressure Torr | Temp. °C. | Wt. % Adsorbed |
|---|---|---|---|---|
| $CO_2$ | 3.3 | 300 | −78 | 6.0 |
| $CO_2$ | 3.3 | 700 | −78 | 7.3 |
| $H_2O$ | 2.65 | 4.7 | 24 | 4.4 |
| $H_2O$ | 2.65 | 20.0 | 24 | 7.8 |

The pore size of the activated product is about 3.3 Angstroms, since Ar, which has a kinetic diameter of 3.4 Angstroms, showed no adsorption into the structure at −196° C.

EXAMPLE 39

Luminescence behavior of the compositions TMA-MnGS-2 and TMA-MnZnGS-2 were measured by standard fluorescence techniques. The composition TMA-MnGS-2 was prepared analogously to TMA-CuGS-2 in Example 32, except that 0.38 grams of manganese acetate ($Mn(CH_3COO)_2·4H_2O$) was substituted for the copper acetate and the reaction mixture was digested for 114 hr. The composition TMA-MnZnGS-2 was prepared analogously to TMA-MnCoGS-2 in Example 33, except that 0.9 grams of zinc acetate ($Zn(CH_3COO)_2·4H_2O$) was substituted for the cobalt acetate. Elemental analyses of the two products gave compositions of:

$$0.38TMA:Ge_{0.85}Mn_{0.15}S_{2.0}:0.17H_2O, \text{ and}$$

$$0.35TMA:Ge_{0.88}Mn_{0.07}Zn_{0.05}S_{2.0}:0.2H_2O.$$

X-ray powder diffraction patterns of both compositions showed the major product to possess an essentially identical diffraction pattern as the TMA-CuGS-2 product in Example 32.

Fluorescence was characterized by emission bands between 550 and 670 nm, the most intense of which, at 590 nm, is characteristic of tetrahedral Mn(II). The compositions were excited at both 440 and 355 nm excitation wavelengths, both of which resulted in observed fluorescence. The TMA-MnGS-2 composition displayed fluorescence which was 100 times more intense than the TMA-MnZnGS-2 composition, indicating that the intensity of emission is controllable through adjustment of the product composition.

We claim as our invention:

1. A hydrocarbon conversion process comprising contacting a hydrocarbon under hydrocarbon conversion conditions with a crystalline composition having a three-dimensional microporous framework structure of $MA_2$ units, where A is sulfur or selenium having an intracrystalline pore system and having the empirical formula expressed in molar ratios: $xR:MA_{2\pm0.2}:zH_2O$ where R represents at least one organic templating agent present in the intracrystalline pore system, x has a value greater than 0 to about 1.0, and z has a value of about 0 to about 4.0 and M is germanium, tin, or a combination thereof, to give a hydroconverted product.

2. The process of claim 1 where the crystalline composition is further characterized in having the empirical formula $xR:M_{1-y}M'_yA_{2\pm0.2}:zH_2O$ where y varies from greater than 0 to about 0.5 and M' is a metal that: (a) occurs in sulfide or selenide minerals formed from hot aqueous solution; (b) forms stable aqueous thiometallate or selenometallate compounds or forms stable bisulfide or biselenide complexes and (c) gives a minimum framework charge from about 0 to about −1 per metal atom in a $M_{1-y}M'_yA_{2\pm0.2}$ framework structure.

3. The process of claim 2 where the templating agent (R) has been removed from the crystalline composition.

4. The process of claim 1 where the templating agent (R) has been removed from the crystalline composition.

5. The process of claim 1 further characterized in that the hydrocarbon conversion process is hydrotreating.

6. The process of claim 2 further characterized in that the hydrocarbon conversion process is hydrotreating.

7. The process of claim 3 further characterized in that the hydrocarbon conversion process is hydrotreating.

8. The process of claim 4 further characterized in that the hydrocarbon conversion process is hydrotreating.

9. The process of claim 1 where the hydrocarbon conversion process is hydrocracking.

10. The process of claim 2 where the hydrocarbon conversion process is hydrocracking.

11. The process of claim 3 where the hydrocarbon conversion process is hydrocracking.

12. The process of claim 4 where the hydrocarbon conversion process is hydrocracking.

13. The process of claim 1 where the hydrocarbon conversion process is hydrogenation.

14. The process of claim 2 where the hydrocarbon conversion process is hydrogenation.

15. The process of claim 3 where the hydrocarbon conversion process is hydrogenation.

16. The process of claim 4 where the hydrocarbon conversion process is hydrogenation.

* * * * *